US009857885B2

(12) United States Patent
Yamamoto

(10) Patent No.: US 9,857,885 B2
(45) Date of Patent: Jan. 2, 2018

(54) INPUT APPARATUS, CONTROL APPARATUS, CONTROL SYSTEM, CONTROL METHOD, AND HANDHELD APPARATUS

(75) Inventor: Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1789 days.

(21) Appl. No.: 12/531,177

(22) PCT Filed: Sep. 16, 2008

(86) PCT No.: PCT/JP2008/066678
§ 371 (c)(1),
(2), (4) Date: Sep. 14, 2009

(87) PCT Pub. No.: WO2009/035124
PCT Pub. Date: Mar. 19, 2009

(65) Prior Publication Data
US 2010/0103100 A1   Apr. 29, 2010

(30) Foreign Application Priority Data

Sep. 14, 2007 (JP) ................................ 2007-239863

(51) Int. Cl.
*G06F 3/0346* (2013.01)
*G06F 3/038* (2013.01)
(52) U.S. Cl.
CPC ............ *G06F 3/0346* (2013.01); *G06F 3/038* (2013.01)
(58) Field of Classification Search
CPC ............. G09G 5/00; G09G 3/02; G06F 3/033
(Continued)

(56) References Cited

U.S. PATENT DOCUMENTS

2007/0080951 A1* 4/2007 Maruyama et al. .......... 345/173
2007/0252813 A1* 11/2007 Liberty et al. ............... 345/156

FOREIGN PATENT DOCUMENTS

JP 07-028591 1/1995
JP 10-253359 9/1998
(Continued)

OTHER PUBLICATIONS

International Search Report dated Dec. 17, 2008, for corresponding Patent Application PCT/JP2008/066678.
(Continued)

*Primary Examiner* — Tony N Ngo
(74) *Attorney, Agent, or Firm* — K&L Gates LLP

(57) ABSTRACT

An input apparatus, a control apparatus, a control system, and a control method that are capable of correcting an output signal when a hand movement is input to the input apparatus and with which a user does not feel a phase delay are provided. An input apparatus includes a velocity calculation section, a filter, a control section, and a memory. The velocity calculation section calculates velocity values of a casing in X'- and Y'-axis directions based on physical amounts output from a sensor unit like acceleration values in the X'- and Y'-axis directions output from an acceleration sensor unit. The filter attenuates, by predetermined scale factors, velocity values of signals of the predetermined frequency range out of the velocity values calculated by the velocity calculation section. Since the filter dynamically attenuates the velocity values of a shake frequency range in accordance with the velocity values, a precise pointing operation with a pointer becomes possible.

17 Claims, 24 Drawing Sheets

(58) Field of Classification Search
USPC .................................... 345/156, 158, 164
See application file for complete search history.

(56) References Cited

FOREIGN PATENT DOCUMENTS

| | | |
|---|---|---|
| JP | 10-253360 | 9/1998 |
| JP | 10-253361 | 9/1998 |
| JP | 11-085387 | 3/1999 |
| JP | 2000-148351 | 5/2000 |
| JP | 2000-148379 | 5/2000 |
| JP | 2001-056743 | 2/2001 |
| JP | 2001-159951 | 6/2001 |
| JP | 2002-091693 | 3/2002 |
| JP | 3748483 | 12/2005 |
| JP | 5201146 | 6/2013 |
| WO | 2005/109215 | 11/2005 |
| WO | 2009/035124 | 3/2009 |

OTHER PUBLICATIONS

Japanese Patent Office, Office Action issued in connection with Japanese Patent Application No. 2013-010137, dated Sep. 24, 2013. (2 pages).
Japanese Patent Office, Office Action issued in connection with Japanese Patent Application No. 2013-010137, dated Mar. 25, 2013. (3 pages).

* cited by examiner (A)

(B)

INPUT APPARATUS, CONTROL APPARATUS, CONTROL SYSTEM, CONTROL METHOD, AND HANDHELD APPARATUS

CROSS REFERENCE TO RELATED APPLICATIONS

The present application is a National Stage of International Application No. PCT/JP2008/066678 filed on Sep. 16, 2009 and which claims priority to Japanese Patent Application No. 2007-239863 filed on Sep. 14, 2007, the entire contents of which are being incorporated herein by reference.

BACKGROUND

The present disclosure relates to a 3-dimensional operation input apparatus for operating a GUI (Graphical User Interface), a control apparatus for controlling the GUI in accordance with information output from the input apparatus, a control system including those apparatuses, and a control method.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Patent Documents 1 and 2 listed below).

Patent Document 1 discloses an input apparatus including angular velocity gyroscopes of two axes, that is, two angular velocity sensors. Each angular velocity sensor is a vibration-type angular velocity sensor. For example, upon application of an angular velocity with respect to a vibrating body piezoelectrically vibrating at a resonance frequency, Coriolis force is generated in a direction orthogonal to a vibration direction of the vibrating body. The Coriolis force is in proportion to the angular velocity, so detection of the Coriolis force leads to detection of the angular velocity. The input apparatus of Patent Document 1 detects angular velocities about two orthogonal axes by the angular velocity sensors, generates, in accordance with the angular velocities, a signal as positional information of a cursor or the like displayed by a display means, and transmits it to a control apparatus.

Patent Document 2 discloses a pen-type input apparatus including three (triaxial) acceleration sensors and three (triaxial) angular velocity sensors (gyro). The pen-type input apparatus executes various operations based on signals obtained by the three acceleration sensors and the three angular velocity sensors, to thus calculate a positional angle of the pen-type input apparatus.

Because the pointing devices of these types are operated 3-dimensionally, hand movements become a problem. For correcting hand movements, there is means for removing, from output signals of sensors that detect an operational movement of a user, a frequency corresponding to the hand movement using a band limiter (see, for example, Patent Document 3). Patent Document 3 discloses an example where the band limiter removes frequencies ranging from 0.5 to 15 Hz, for example.

Patent Document 1: Japanese Patent Application Laid-open No. 2001-56743 (paragraphs [0030] and [0031], FIG. 3)

Patent Document 2: Japanese Patent No. 3,748,483 (paragraphs [0033] and [0041], FIG. 1)

Patent Document 3: Japanese Patent Application Laid-open No. Hei 07-28591 (paragraphs [0060] and [0062])

However, in a shake frequency area, for example, because the band limiter has lowpass filter characteristics, a phase delay (response delay) of an output signal with respect to an input signal occurs. When a phase delay occurs, a pointer moves on a screen following a movement of the input apparatus such as a pointing device, which is awkward for the user.

Moreover, there are cases where a degree of hand movements differs between a case where the user moves the pointing device speedily and a case where the user moves the pointing device slowly.

In view of the circumstances as described above, it is desired to provide an input apparatus, a control apparatus, a control system, a control method, and a handheld apparatus that are capable of correcting an output signal when a hand movement is input to the input apparatus and with which a user does not feel a phase delay.

SUMMARY

To achieve the object above, according to an embodiment, there is provided an input apparatus controlling a movement of a pointer on a screen, including a casing, a movement signal output means, an attenuation means, and a control means.

The movement signal output means detects a movement of the casing and outputs a signal corresponding to the movement of the casing.

The attenuation means attenuates, by a predetermined scale factor, an output value of a signal of a predetermined frequency range out of an output value output from the movement signal output means.

The control means controls a velocity of the pointer on the screen that corresponds to the movement of the casing by controlling the scale factor based on the signal corresponding to the movement of the casing.

When the "predetermined frequency range" is set to a frequency range corresponding to a hand movement of the user, for example, the output value of the signal of the predetermined frequency range becomes a degree (amplitude and velocity) of hand movements of the user. In this case, by controlling the scale factor based on the output value of the signal of the shake frequency range out of the signal corresponding to the movement of the casing, the scale factor is controlled variably in accordance with the degree of hand movements. Thus, a pointer movement that does not cause the user to feel a phase delay can be realized.

Thus, it becomes possible for the user to perform precise pointing operations with the pointer on the screen even when a vibration including a hand movement occurs in the casing. Moreover, because the scale factor is controlled appropriately in accordance with the movement of the input apparatus, the user can operate the input apparatus without feeling a phase delay as a characteristic of the attenuation means, for example.

Typically, the frequency range corresponding to a hand movement is approximately 1 to 20 Hz.

The scale factor is an element that is multiplied to the output value of the signal of the predetermined frequency range for attenuating the output value and is a value smaller than 1.

The "signal corresponding to the movement of the casing" is, for example, a velocity value, acceleration value, acceleration time change rate, angular velocity value, angular acceleration value, angular acceleration time change rate, or the like that corresponds to the movement of the casing.

The control means may control the scale factor to decrease as the output value of the signal of the predetermined frequency range increases, and control the scale factor to increase as the output value of the signal of the predetermined frequency range decreases.

The degree of hand movements is different for each user, so if the scale factor is determined so that hand movements of users who cause a large hand movement can be suppressed sufficiently, some of the users who cause small hand movements may feel awkwardness regarding the phase delay. By controlling the scale factor to decrease as the hand movement increases and controlling the scale factor to increase as the hand movement decreases based on the degree of hand movements, a setting for minimizing the phase delay within a range in which the hand movement becomes negligible becomes possible.

The movement signal output means may output, as the output value, a velocity value or an angular velocity value corresponding to the movement of the casing, and the control means may control the scale factor based on the velocity value or the angular velocity value.

A relatively-large velocity value indicates that the user is in midst of moving the pointer from a certain position on the screen to a different position relatively distant therefrom. In such a case, unlike a case where a specific position on the screen is targeted for the operation, the hand movement is not much of an importance and an importance is rather placed on following capability with respect to the phase delay. On the other hand, a relatively-small velocity value indicates a case where a specific icon on the screen is targeted for the operation, so an importance is placed on suppression of a hand movement rather than the following capability. Due to such a correlation between the velocity and a shake acceptable amount, by monitoring the velocity value, an operational feeling of the user is improved.

Control of the scale factor by the control means that the control means switches the scale factors stepwise or successively. Stepwise may be two steps as in a two-step switch of whether to cause the attenuation means to function, or may be three steps or more.

"In accordance with the velocity value" refers to not only a case where a relationship between the scale factor and the velocity value is linear, but also a case where the relationship is nonlinear.

The velocity value may be calculated by integrating an acceleration value detected by an acceleration sensor, for example. In this case, as will be described later, a calculation for suppressing an effect of gravity accelerations or an effect of integration errors may be carried out.

Alternatively, it is also possible to obtain radius gyrations of the input apparatus when operated by the user based on acceleration values and angular velocity values respectively detected by acceleration sensors and angular velocity sensors, and calculate the velocity values from the radius gyrations.

Typically, regarding the velocity values, velocity values in a first direction and a second direction different from the first direction are output. Those velocity values are converted into pointer velocities in two directions on the screen respectively corresponding to those two directions. However, regarding the velocity values, only the velocity value in the first direction may be output.

The input apparatus may further include a judgment means for judging whether the velocity value or the angular velocity value is equal to or larger than a first threshold value, and the control means may set the scale factor substantially to 1 when the velocity value or the angular velocity value is equal to or larger than the first threshold value.

Regarding a range of the velocity value equal to or smaller than the first threshold value in which hand movements occur, the velocity value (or angular velocity value) (the same holds true hereinbelow) ranging from a value close to 0 to a second threshold value indicates a case where a specific icon is targeted for the operation, so suppression of a hand movement becomes important. However, particularly the velocity value close to 0 indicates an instant when the user starts moving the input apparatus from a stopped state, or an instant when a cursor that has been moving is stopped on an icon. In this case, the user tends to feel awkwardness due to the phase delay, with the result that operability is lowered. Therefore, since the scale factor gradually decreases as the velocity value increases in this range, awkwardness for the user can be eliminated.

Further, an increase of the velocity value after reaching the second threshold value indicates a case where the pointer is moved from a certain position on the screen to another position distant therefrom. Also in this case, it is considered that elimination of the phase delay tends to be placed with more importance than the influence of hand movements. Therefore, by controlling the scale factor to gradually increase until the velocity value that has exceeded the second threshold value reaches the first threshold value, awkwardness for the user can be eliminated.

"Gradually" means "practically successively", "stepwise", or a combination of those.

The input apparatus may further include a judgment means for judging whether the velocity value or the angular velocity value is equal to or smaller than a third threshold value smaller than the first threshold value, and the control means may set the scale factor substantially to 1 when the velocity value or the angular velocity value is equal to or smaller than the third threshold value.

Extremely-small velocity values (smaller than the third threshold value) indicate a time when the user has almost completely stopped the input apparatus, an instant when the user starts moving the input apparatus from the stopped state, or an instant when the input apparatus 1 is stopped from the moved state. In such a case, the influence of hand movements tends to be placed with more importance than the phase delay. According to the embodiment, it is also possible to eliminate awkwardness due to the phase delay even at the time the movement of the input apparatus is started.

It should be noted that the present disclosure describes the "third threshold value" but not the "first threshold value" and the "second threshold value". The "first threshold value" and the "second threshold value" appear in the other invention described above, so the "third threshold value" is described for making a conceptual distinction. The same holds true for a "fourth threshold value" and a "fifth threshold value" of the invention described below. For example, although the second threshold value and the third threshold value are typically different values, it is also possible to use the same value.

Alternatively, the control means may control the scale factor to gradually decrease as the velocity value or the angular velocity value increases until the velocity value or the angular velocity value reaches a fourth threshold value larger than the third threshold value, and control the scale factor to gradually increase as the velocity value or the angular velocity value increases until the velocity value or the angular velocity value reaches a fifth threshold value after reaching the fourth threshold value.

The "fourth threshold value" and the "fifth threshold value" are conceptually the same as the "second threshold value" and the "first threshold value" in the invention described above (values thereof may either be different or the same).

The input apparatus may further include a storage means for storing a plurality of control patterns of the control means with respect to the scale factor corresponding to the velocity value or the angular velocity value, and a switch means for switching the plurality of stored control patterns.

The user only needs to switch the control patterns using the switch means. In this case, it is only necessary that a mechanical switch (e.g., button switch or DIP switch), a photo switch, an electrostatic switch, a piezoelectric switch, or the like (the same holds true hereinbelow) be provided to the input apparatus. Alternatively, the input apparatus only needs to include software for GUIs as the switch means. When the input apparatus includes the software for GUIs, image information of a GUI and the like only needs to be transmitted to the control apparatus that is communicating with the input apparatus. Alternatively, the switch means may switch the control patterns in accordance with a mode of the GUI on the screen, the display of which is controlled by the control apparatus.

The switch means may selectively make a switch between a first control pattern in which the scale factor is nonconstant and a second control pattern as a manual input mode in which the scale factor is constant.

The movement signal output means may additionally output an acceleration value corresponding to the movement of the casing. In this case, the control means may control the scale factor based on the acceleration value and the velocity value or the angular velocity value.

When the acceleration of the input apparatus is large, it can be considered that the user is trying to move the pointer speedily. Thus, it can be assumed that, as in the case where the velocity value is large, the user is in midst of moving the pointer from a certain position on the screen to a different position relatively distant therefrom. Therefore, also in this case, following capability with respect to the phase delay is placed with more importance than the influence of hand movements. In other words, because the acceleration value and the shake acceptable amount have a correlation like the velocity and the shake acceptable amount, by monitoring the acceleration, an operational feeling for the user is improved.

The movement signal output means may include an acceleration sensor to detect an acceleration value of the casing in a first direction, an angular velocity sensor to detect an angular velocity value about an axis in a second direction different from the first direction, and a velocity value calculation means for calculating a velocity value in the first direction based on at least one of the acceleration value and the angular velocity value.

The movement signal output means may output, as the output value, a first velocity value corresponding to the movement of the casing in a first direction and a second velocity value corresponding to the movement of the casing in a second direction different from the first direction. In this case, the attenuation means attenuates the output value of the signal of the predetermined frequency range out of the output value by predetermined first scale factor and second scale factor respectively corresponding to the first direction and the second direction. Further, the control means controls the first scale factor and the second scale factor based on the first velocity value and the second velocity value.

The control means may control the first scale factor and the second scale factor based on either one of a combined value of the first velocity value and the second velocity value and a larger one of an absolute value of the first velocity value and an absolute value of the second velocity value. The "combined value" is typically a combined vector amount.

Alternatively, the movement signal output means may output, as the output value, a first angular velocity value corresponding to the movement of the casing about an axis in a second direction different from a first direction and a second angular velocity value corresponding to the movement of the casing about an axis in the first direction. In this case, the attenuation means attenuates the output value of the signal of the predetermined frequency range out of the output value by predetermined first scale factor and second scale factor respectively corresponding to a direction about the axis in the first direction and a direction about the axis in the second direction. Further, the control means controls the first scale factor and the second scale factor based on the first angular velocity value and the second angular velocity value.

The control means may control the first scale factor and the second scale factor based on either one of a combined value of the first angular velocity value and the second angular velocity value and a larger one of an absolute value of the first angular velocity value and an absolute value of the second angular velocity value.

The input apparatus may further include a velocity value storage means capable of storing a predetermined number of a plurality of velocity values that are temporally consecutive, and a sign judgment means for judging whether signs of the predetermined number of the plurality of stored velocity values are the same. In this case, the control means controls the scale factor so that a function of the attenuation means is stopped or weakened when the signs of the predetermined number of velocity values that have been sampled are the same. When the signs of the predetermined number of the plurality of velocity values are the same, a velocity direction has not changed during that period. Therefore, in this case, it can be considered that the user is in midst of moving the pointer from a certain position on the screen to a different position relatively distant therefrom. If the attenuation means exerts its function in this case, the user may feel awkwardness due to the phase delay. Therefore, it is only necessary that the function of attenuating the velocity values be stopped or weakened. The "velocity value" may be replaced by the "angular velocity value".

According to an embodiment, there is provided a control apparatus controlling a movement of a pointer on a screen in accordance with input information transmitted from an input apparatus including a casing, a movement signal output means for detecting a movement of the casing and outputting a signal corresponding to the movement of the casing, and a transmission means for transmitting the output signal as the input information, the control apparatus including a reception means, an attenuation means, a control means, and a coordinate information generation means.

The reception means receives the input information.

The attenuation means attenuates, by a predetermined scale factor, an output value of a signal of a predetermined frequency range out of an output value of the signal as the received input information.

The control means controls the scale factor based on the signal corresponding to the movement of the casing.

The coordinate information generation means generates coordinate information of the pointer on the screen that corresponds to the movement of the casing under control of the control means.

According to an embodiment, there is provided a control system controlling a movement of a pointer on a screen, including an input apparatus including a casing, a movement signal output means, an attenuation means, a control means, and a transmission means, and a control apparatus including a reception means and a coordinate information generation means.

In particular, the control means generates input information for controlling a velocity of the pointer on the screen that corresponds to the movement of the casing by controlling the scale factor based on the signal corresponding to the movement of the casing.

According to another embodiment, there is provided a control system including an input apparatus including a casing, a movement signal output means, and a transmission means, and a control apparatus including a reception means, an attenuation means, a control means, and a coordinate information generation means.

In particular, the control means controls the scale factor based on the signal corresponding to the movement of the casing.

According to an embodiment, there is provided a control method including detecting a movement of a casing of an input apparatus.

A signal corresponding to the movement of the casing obtained by the detection is output.

By a predetermined scale factor, an output value of a signal of a predetermined frequency range out of an output value that has been output is attenuated.

The scale factor is controlled based on the signal corresponding to the movement of the casing.

Coordinate information of a pointer on a screen that corresponds to the movement of the casing is generated based on the control of the scale factor.

According to an embodiment, there is provided a handheld apparatus including a casing, a display section, a movement signal output means, an attenuation means, and a control means.

The movement signal output means detects a movement of the casing and outputs a signal corresponding to the movement of the casing.

The attenuation means attenuates, by a predetermined scale factor, an output value of a signal of a predetermined frequency range out of an output value output from the movement signal output means.

The control means generates input information for controlling a velocity of a pointer on a screen of the display section that corresponds to the movement of the casing by controlling the scale factor based on the signal corresponding to the movement of the casing. According to another embodiment, there is provided an input apparatus including a casing, a movement signal output means, an attenuation means, a storage means, and a switch means.

The movement signal output means detects a movement of the casing and outputs a signal corresponding to the movement of the casing for moving the pointer on the screen.

The attenuation means attenuates an output value of a signal of a predetermined frequency range out of an output value output from the movement signal output means.

The storage means stores a plurality of control patterns for controlling a scale factor of the attenuation means.

The switch means switches the plurality of control patterns.

In the embodiments, the user only needs to switch the control patterns of the scale factor using the switch means. In this case, it is only necessary that a mechanical switch (e.g., button switch or DIP switch), a photo switch, an electrostatic switch, a piezoelectric switch, or the like be provided to the input apparatus as the switch means. Alternatively, switch information may be transmitted to the control apparatus that includes the software for GUIs in accordance with a switch of the control pattern of the scale factor by the switch means of the input apparatus. Further, it is also possible for the control apparatus that has received the switch information to switch the mode of the GUI on the screen.

Alternatively, as another invention, the control apparatus may include at least one of the attenuation means, the storage means, and the switch means. In this case, for example, the control apparatus receives the input information as the output value output from the movement signal output means of the input apparatus and causes the attenuation means to attenuate the output value of the signal of the predetermined frequency range. The control pattern of the scale factor is thus switched by the user. Examples of the switch means include a mechanical switch provided to the control apparatus and a GUI stored in the control apparatus.

According to another embodiment, there is provided a handheld apparatus including a casing, a display section, a movement signal output means, an attenuation means, a storage means, and a switch means.

The movement signal output means detects a movement of the casing and outputs a signal corresponding to the movement of the casing for moving the pointer on a screen of the display section.

The attenuation means attenuates an output value of a signal of a predetermined frequency range out of an output value output from the movement signal output means.

The storage means stores a plurality of control patterns for controlling a scale factor of the attenuation means.

The switch means switches the plurality of control patterns.

When the handheld apparatus includes the software for GUIs, the GUI on the screen may be switched in accordance with the switch of the control pattern. In contrast, with the GUI as the switch means, the control pattern may be switched in accordance with a switch of the GUI on the screen.

As described above, according to the embodiments, an output value can be corrected when a hand movement is input to an input apparatus, and a user is prevented from feeling a phase delay.

Additional features and advantages are described herein, and will be apparent from, the following Detailed Description and the figures.

DETAILED DESCRIPTION

Hereinafter, embodiments will be described with reference to the drawings.

Figure 1:
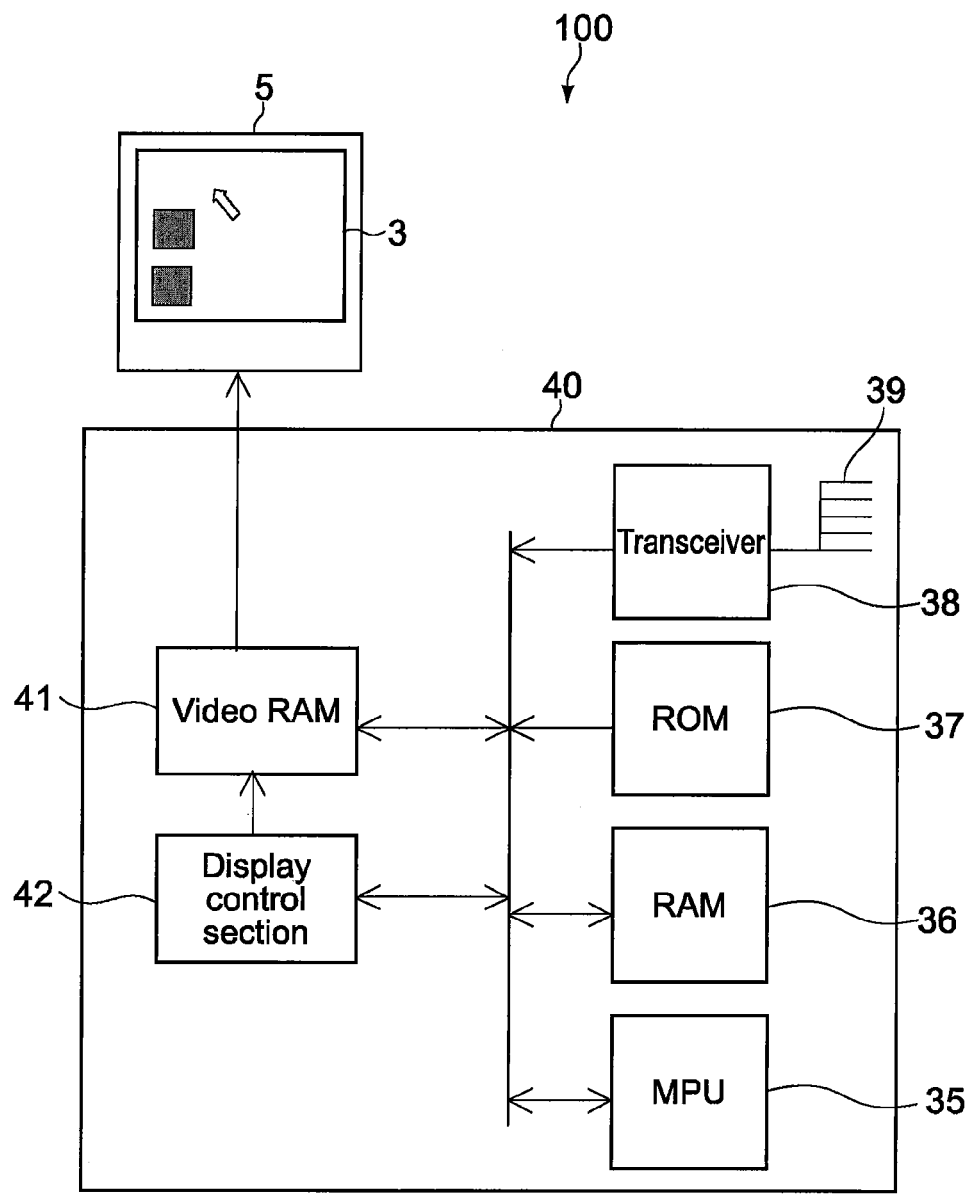
FIG. 1 A diagram showing a control system according to an embodiment.
Figure 1:
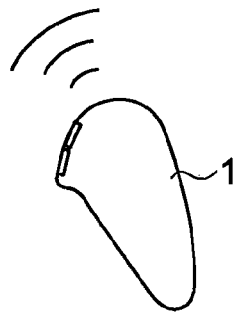

FIG. 1 is a diagram showing a control system according to an embodiment. A control system 100 includes a display apparatus 5, a control apparatus 40, and an input apparatus 1.

Figure 2:
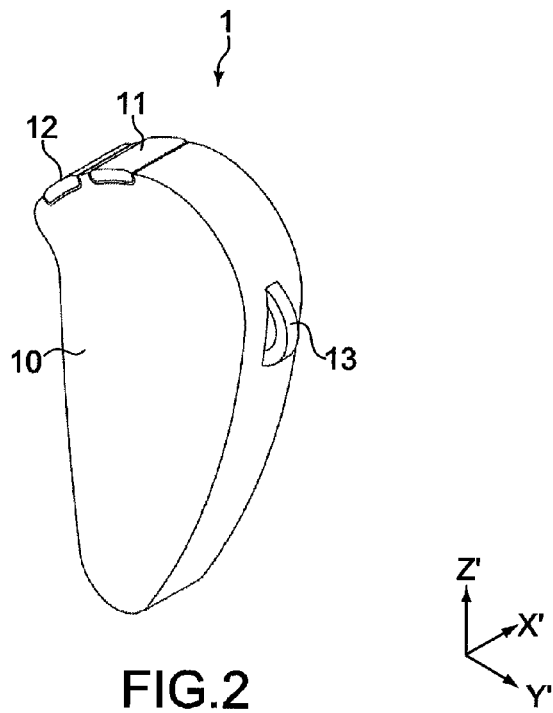
FIG. 2 A perspective diagram showing an input apparatus.

FIG. 2 is a perspective diagram showing the input apparatus 1. The input apparatus 1 is of a size that a user is capable of holding. The input apparatus 1 includes a casing 10 and operation sections including two buttons 11 and 12 provided at an upper portion of the casing 10, a rotary wheel button 13, and the like, for example. The button 11 disposed closer to the center of the upper portion of the casing 10 functions as a left button of a mouse as an input device for a PC, for example, and the button 12 adjacent to the button 11 functions as a right button of a mouse.

For example, a "drag and drop" operation may be executed by moving the input apparatus 1 while pressing the button 11, a file may be opened by double-clicking the button 11, and a screen 3 may be scrolled by the wheel button 13. Locations of the buttons 11 and 12 and the wheel button 13, a content of a command issued, and the like can arbitrarily be changed.

Figure 3:
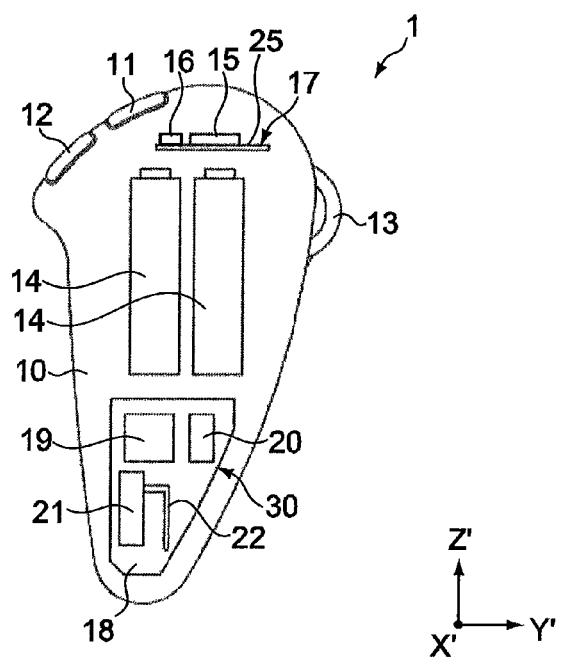
FIG. 3 A diagram schematically showing an internal structure of the input apparatus.
Figure 4:
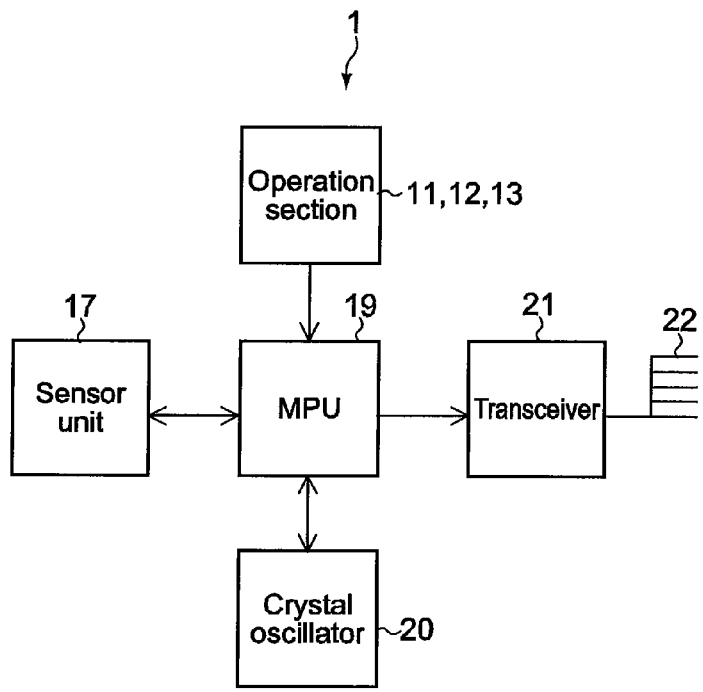
FIG. 4 A block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
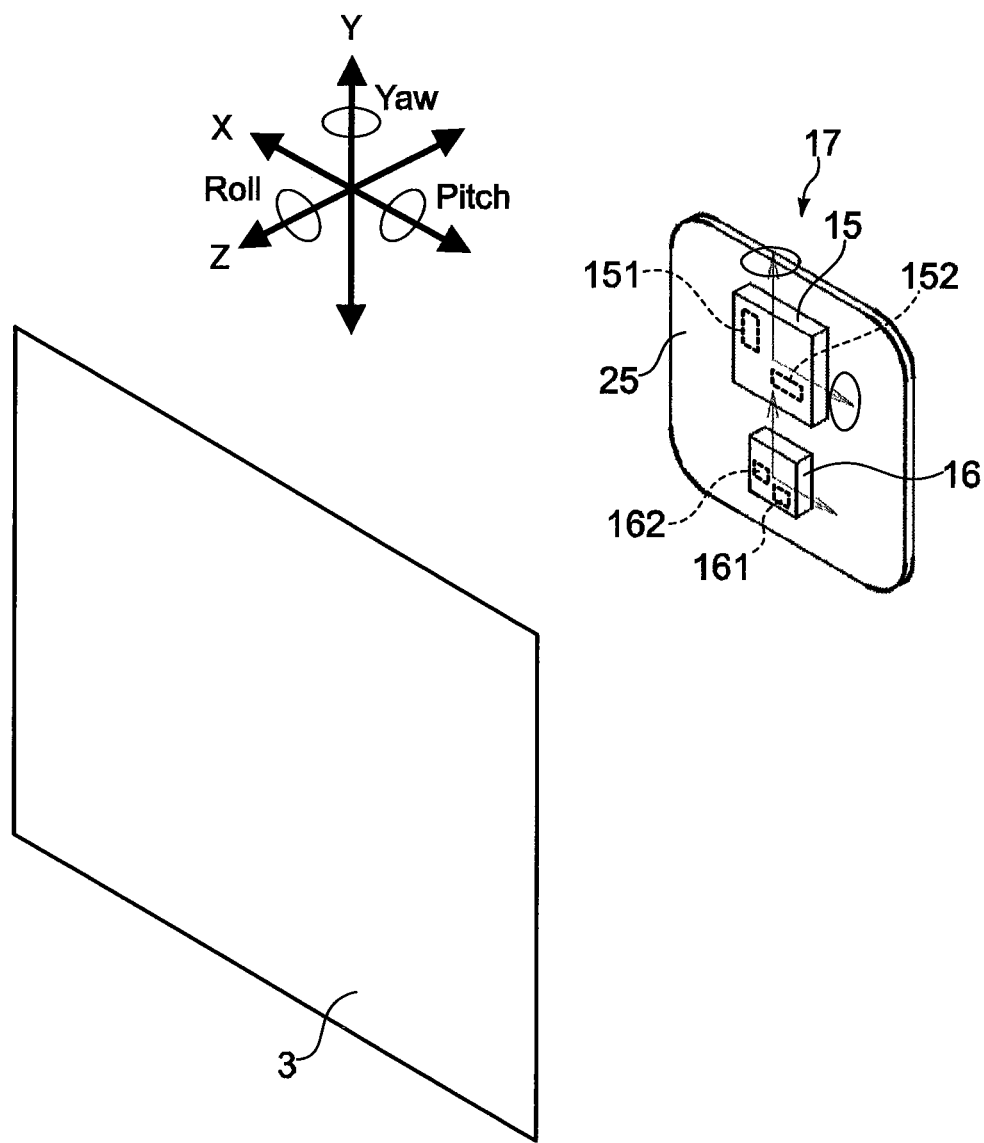
FIG. 8 A perspective diagram showing a sensor unit.

FIG. 8 is a perspective diagram showing the sensor unit 17. The sensor unit 17 includes an acceleration sensor unit 16 for detecting accelerations in different angles such as along two orthogonal axes (X axis and Y axis). Specifically, the acceleration sensor unit 16 includes two sensors, that is, a first acceleration sensor 161 and a second acceleration sensor 162. The sensor unit 17 further includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152. The acceleration sensor unit 16 and the angular velocity sensor unit 15 are packaged and mounted on a circuit board 25.

As each of the first angular velocity sensor 151 and the second angular velocity sensor 152, a vibration gyro sensor for detecting Coriolis force in proportion to an angular velocity is used. As each of the first acceleration sensor 161 and the second acceleration sensor 162, any sensor such as a piezoresistive sensor, a piezoelectric sensor, or a capacitance sensor may be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. A plane including an X' axis and a Y' axis is an acceleration detection surface, that is, a plane substantially parallel to a main surface of the circuit board 25.

In descriptions below, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Further, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section, and the like, and executes various kinds of operational processing in order to generate predetermined control signals in response to those input signals.

The transceiver 21 transmits, as RF radio signals, the control signals (input information) generated in the MPU 19 to the control apparatus 40 via the antenna 22. The transceiver 21 is also capable of receiving various signals transmitted from the control apparatus 40.

The crystal oscillator 20 generates clocks and supplies them to the MPU 19. As the batteries 14, dry cell batteries, rechargeable batteries, and the like are used.

The control apparatus 40 is a computer and includes an MPU 35 (or CPU), a display control section 42, a RAM 36, a ROM 37, a video RAM 41, an antenna 39, and a transceiver 38.

The transceiver 38 receives the control signal transmitted from the input apparatus 1 via the antenna 39. The transceiver 38 is also capable of transmitting various signals to the input apparatus 1. The MPU 35 analyzes the control signal and executes various kinds of operational processing. The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the PC, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 5:
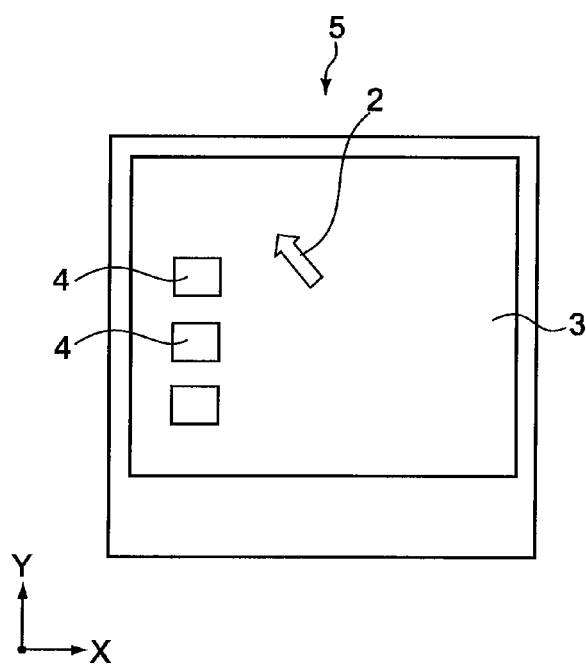
FIG. 5 A diagram showing an example of a screen displayed on a display apparatus.

FIG. 5 is a diagram showing an example of the screen 3 displayed on the display apparatus 5. UIs such as icons 4 and a pointer 2 are displayed on the screen 3. The icons are images on the screen 3 representing functions of programs, execution commands, file contents, and the like of the computer. It should be noted that on the screen 3, the horizontal direction is referred to as X-axis direction and the vertical direction is referred to as Y-axis direction.

Figure 6:
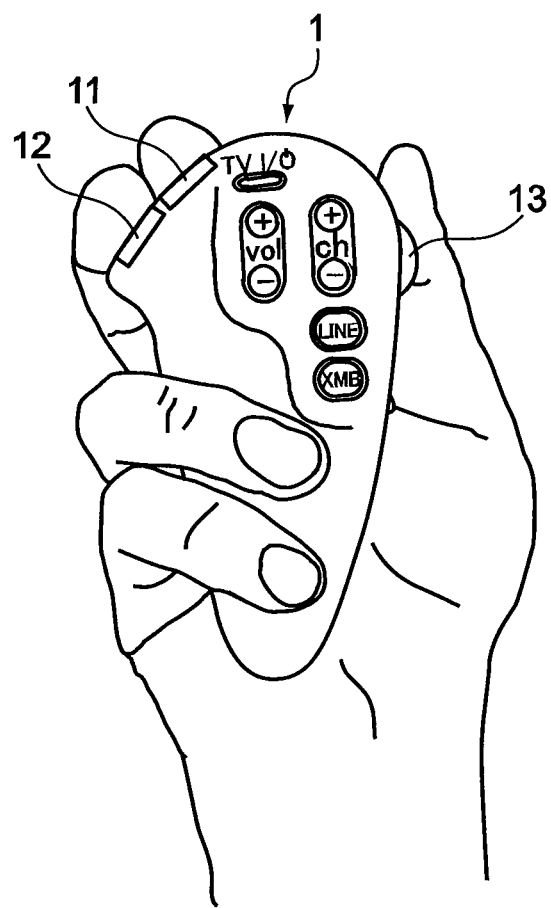
FIG. 6 A diagram showing a state where a user is holding the input apparatus.

FIG. 6 is a diagram showing a state where a user is holding the input apparatus 1. As shown in FIG. 6, the input apparatus 1 may include, in addition to the buttons 11, 12, and 13, operation sections including various operation buttons such as those provided to a remote controller for operating a television or the like and a power supply switch, for example. When the user moves the input apparatus 1 in the air or operates the operation sections while holding the input apparatus 1 as shown in the figure, input information thereof is output to the control apparatus 40, and the control apparatus 40 controls the pointer.

Figure 7:
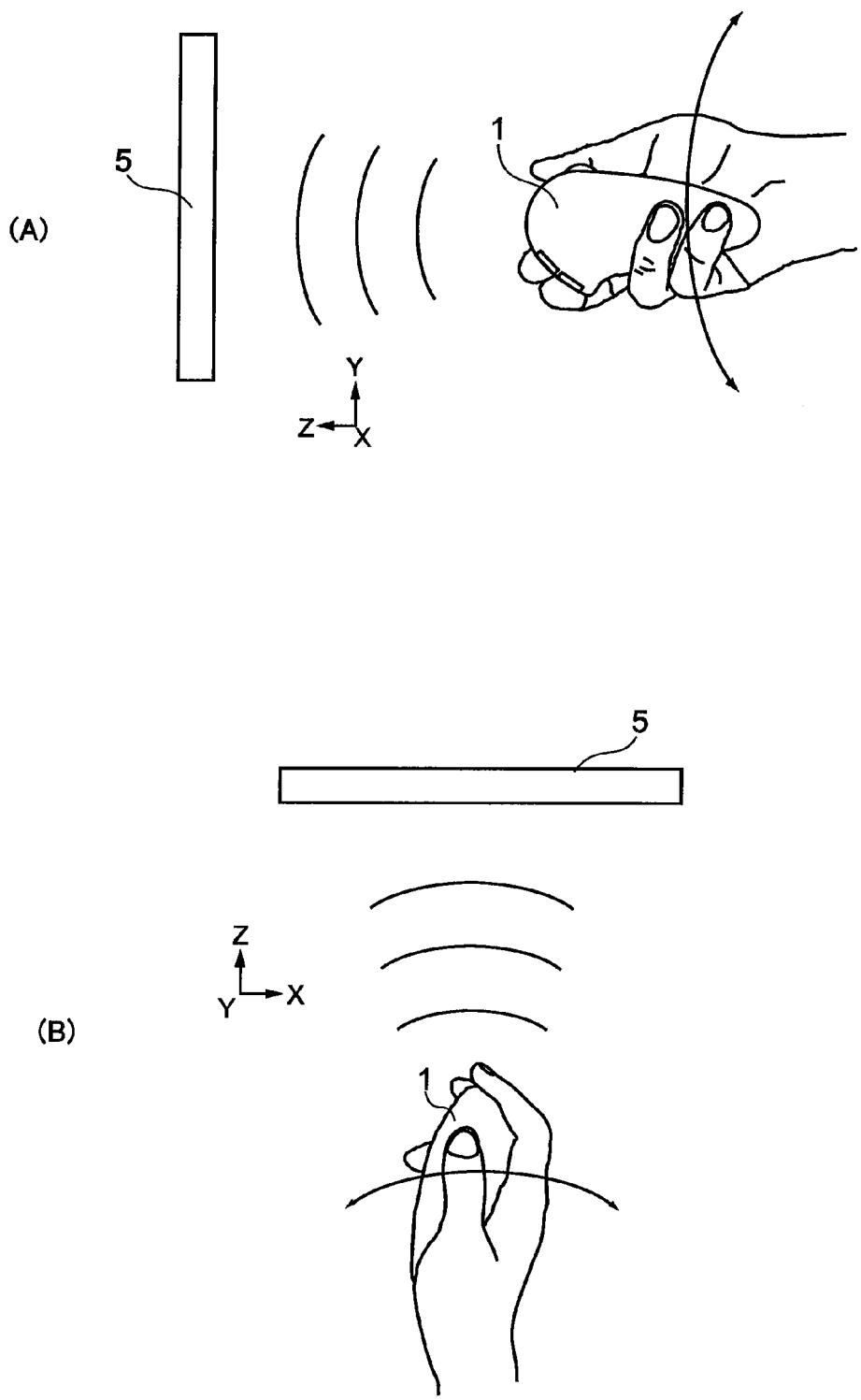
FIG. 7 Explanatory diagrams showing typical examples of ways of moving the input apparatus and ways a pointer moves on the screen accordingly.

Next, a description will be given on typical examples of ways of moving the input apparatus 1 and ways the pointer 2 moves on the screen 3 accordingly. FIG. 7 are explanatory diagrams therefor.

As shown in FIGS. 7A and 7B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 (see FIG. 8) of the sensor unit 17 is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7A and 7B will be referred to as reference position.

As shown in FIG. 7A, in the reference position, the user moves a wrist or an arm in the vertical direction or swings it in the pitch direction. At this time, the second acceleration sensor 162 detects an acceleration in the Y'-axis direction and the second angular velocity sensor 152 detects an angular velocity about the X' axis. Based on those detection values, the control apparatus 40 controls display of the pointer 2 so as to move the pointer 2 in the Y-axis direction.

Meanwhile, as shown in FIG. 7B, in the reference position, the user moves the wrist or the arm in the lateral direction or swings it in the yaw direction. At this time, the first acceleration sensor 161 detects an acceleration in the X'-axis direction (first acceleration) and the first angular velocity sensor 151 detects an angular velocity about the Y' axis. Based on those detection values, the control apparatus 40 controls display of the pointer 2 so as to move the pointer 2 in the X-axis direction.

Although descriptions will be given later, in one embodiment, the MPU 19 of the input apparatus 1 calculates velocity values in the X'- and Y'-axis directions based on the detection values detected by the sensor unit 17, in accordance with programs stored in the built-in nonvolatile memory. In this case, mainly the MPU 19 of the input apparatus 1 functions as a movement signal output means. Here, for controlling the movement of the pointer 2, a dimension of integration values (velocities) of biaxial acceleration values detected by the acceleration sensor unit 16 is used, for example. Then, input information of the velocity dimension is transmitted to the control apparatus 40.

In another embodiment, the input apparatus 1 transmits, as the input information, physical amounts detected by the sensor unit 17 to the control apparatus 40. In this case, the MPU 35 of the control apparatus 40 calculates the velocity values in the X'- and Y'-axis directions based on the received input information in accordance with the program stored in the ROM 37, and controls display so that the pointer 2 moves in accordance with the velocity values (see FIG. 23).

The control apparatus 40 converts a displacement in the X-axis direction or the yaw direction per unit time into a displacement amount of the pointer 2 on the X axis on the screen 3, and converts a displacement in the Y-axis direction or the pitch direction per unit time into a displacement amount of the pointer 2 on the Y axis on the screen 3, to thus move the pointer 2. Typically, regarding the velocity values supplied every predetermined number of clocks, the MPU 35 of the control apparatus 40 adds an n-th velocity value that has been supplied to a (n−1)-th velocity value that has been supplied. Accordingly, the n-th velocity value that has been supplied corresponds to the displacement amount of the pointer 2, and coordinate information of the pointer 2 on the screen 3 is generated. In this case, mainly the MPU 35 of the control apparatus 40 functions as a coordinate information generation means.

For suppressing the movement of the pointer that corresponds to a vibration of the casing 10 of the input apparatus 1 caused by a hand movement of the user, the control system 100 of this embodiment includes a function of attenuating, by a predetermined scale factor, an output value of a signal of a predetermined frequency range out of an output value of the velocity calculated as described above. The input apparatus 1 typically has that function.

Figure 9:
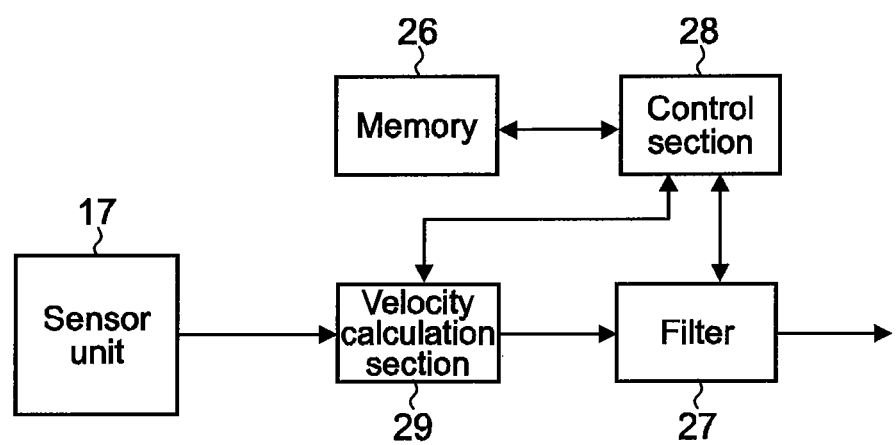
FIG. 9 A block diagram showing a structure of the input apparatus for realizing a function of suppressing a movement of the pointer according to a vibration of a casing of the input apparatus due to a hand movement of the user.

FIG. 9 is a block diagram showing a structure of the input apparatus 1 for realizing that function. The input apparatus 1 includes a velocity calculation section 29, a filter 27, a control section 28, and a memory 26.

The velocity calculation section 29 calculates the velocity values of the casing 10 in the X'- and Y'-axis directions based on the physical amounts output from the sensor unit 17 like acceleration values in the X'- and Y'-axis directions output from the acceleration sensor unit 16.

The filter 27 attenuates, by predetermined scale factors, velocity values of signals of the predetermined frequency range out of the velocity values calculated by the velocity calculation section 29. The predetermined frequency range is a frequency range corresponding to a hand movement. The frequency range is typically 1 to 20 Hz, but is not limited thereto. Hereinafter, the predetermined frequency will be referred to as shake frequency. The filter 27 is constituted of a digital filter.

The control section 28 controls data processing by the velocity calculation section 29 and the filter 27. The memory 26 is a storage area used for processing by the control section 28.

The velocity calculation section 29, the filter 27, the control section 28, and the memory 26 are functions of the MPU 19, for example. Those functions may be realized by a DSP (Digital Signal Processor), an FPGA (Field Programmable Gate Array), or the like. The memory 26 may be incorporated into the MPU or may be provided separately. The memory 26 is a RAM or a ROM.

Figure 10:
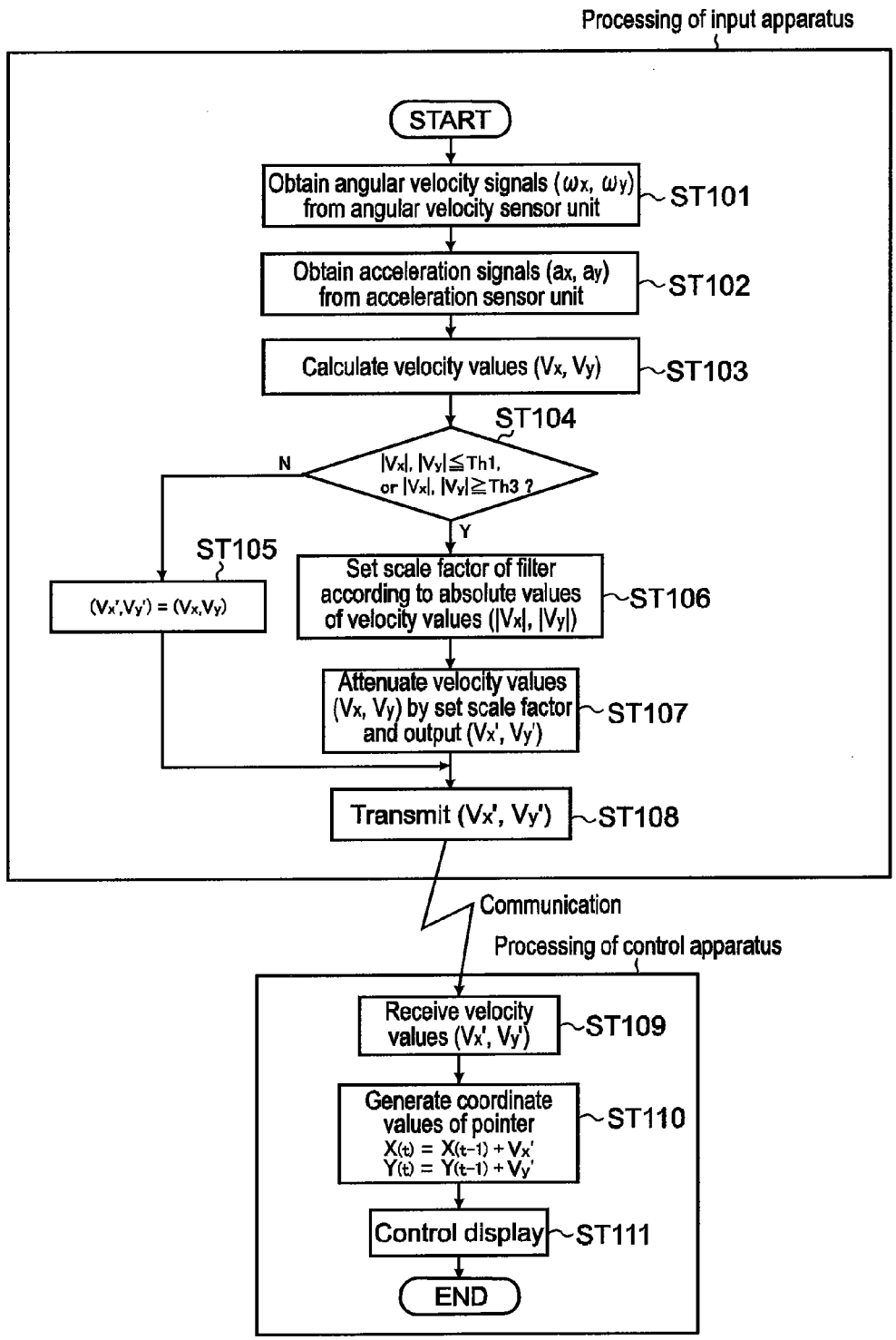
FIG. 10 A flowchart showing an operation of the control system according to the embodiment.

Next, an operation of the control system structured as described above will be described. FIG. 10 is a flowchart showing the operation.

The power of the input apparatus 1 is turned on. For example, the user turns on the power supply switch or the like provided to the input apparatus 1 or the control apparatus 40 to turn on the power of the input apparatus 1. Upon turning on the power, the MPU 19 obtains biaxial angular velocity signals (second angular velocity value $\omega_x$ and first angular velocity value $\omega_y$) output from the angular velocity sensor unit 15 every predetermined clocks (Step 101). The MPU 19 also obtains biaxial acceleration signals (first acceleration value $a_x$ and second acceleration value $a_y$) output from the acceleration sensor unit 16 every predetermined clocks. The acceleration signals are signals corresponding to the position of the input apparatus 1 at a point when the power is turned on (hereinafter, referred to as initial position). Although the acceleration signals are obtained after the angular velocity signals are obtained as shown in FIG. 10, the MPU 19 typically carries out Steps 101 and 102 in sync. Alternatively, the angular velocity signals may be obtained after the acceleration signals are obtained. The order in which the angular velocity signals and the acceleration signals are obtained is not limited, and the same holds true in FIGS. 14, 17, 18, 22, and 23.

There are cases where the initial position is the reference position. However, a position at which an entire amount of a gravity acceleration is detected in the X-axis direction, that is, a position at which an output of the first acceleration sensor 161 is an acceleration value corresponding to the gravity acceleration and an output of the second acceleration sensor 162 is 0 is also possible. In addition, the input apparatus 1 may be tilted in the roll direction. The control system 100 of this embodiment removes an effect of the gravity acceleration that acts on the acceleration sensor unit 16 by methods shown in FIGS. 18 to 22 as will be described later.

The velocity calculation section 29 calculates the velocity values ($V_x$, $V_y$) by an integration operation based on the acceleration values ($a_x$, $a_y$) (Step 103). The calculation of the velocity values by the velocity calculation section 29 will be described later in detail.

Figure 11:
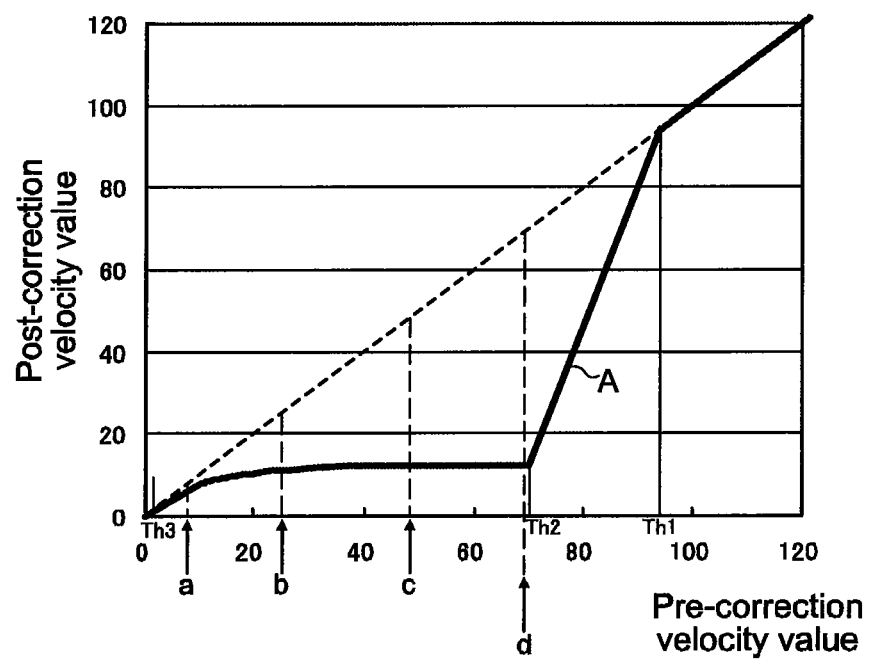
FIG. 11 A graph showing an example of filter characteristics (velocity profile) at a typical frequency that is within a frequency range of a hand movement.
Figure 12:
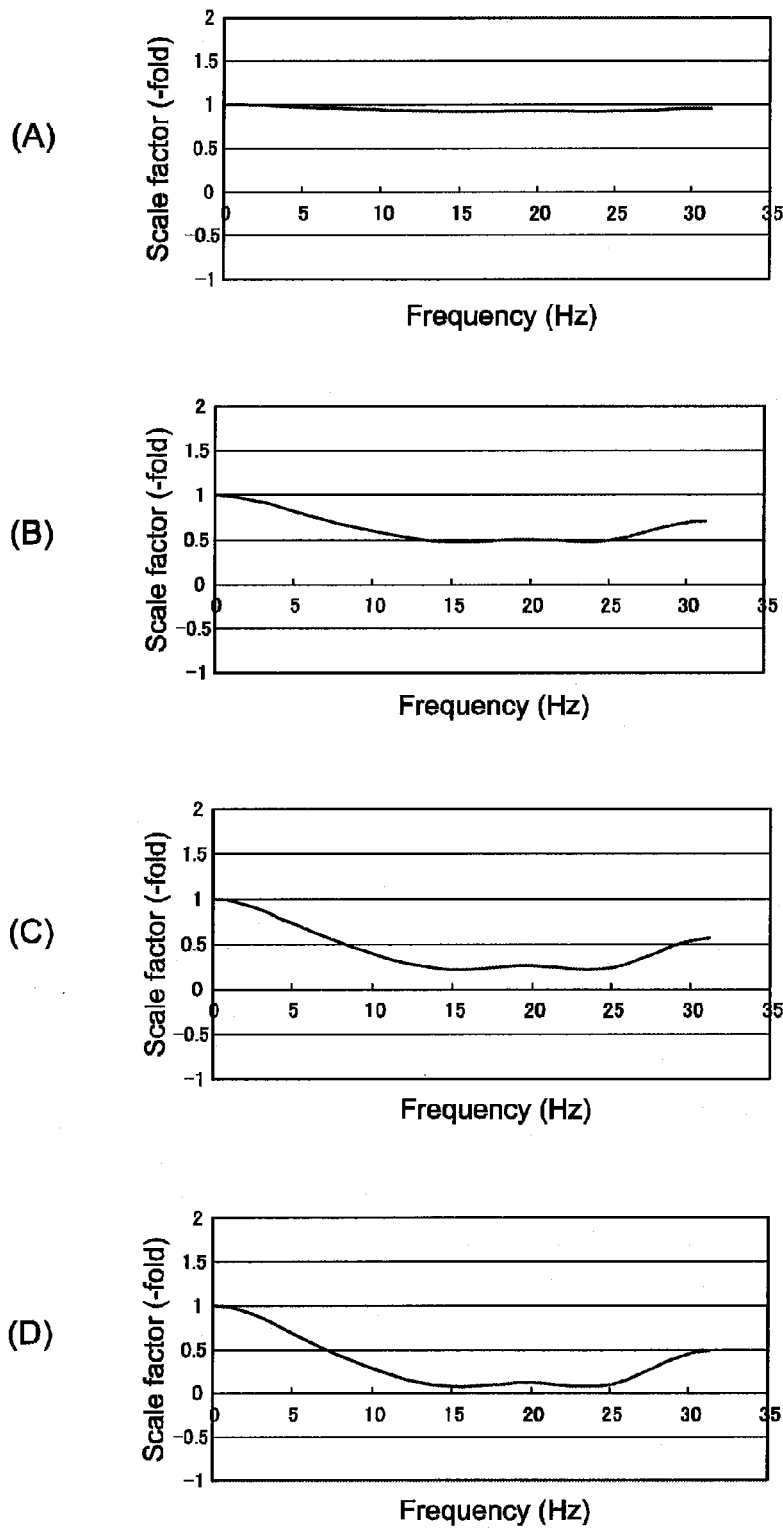
FIG. 12 Graphs showing filter frequency characteristics respectively corresponding to pre-correction velocity values a to d shown in FIG. 11.

The calculated velocity values ($V_x$, $V_y$) are input to the filter 27. FIG. 11 is a graph showing an example of characteristics of the filter 27 (hereinafter, referred to as velocity profile) at a typical frequency (e.g., 15 Hz) that is within the shake frequency range. The abscissa axis in the graph represents a velocity value of the input apparatus 1 before correction by the filter 27 (hereinafter, referred to as pre-correction velocity value), and the ordinate axis represents a velocity value of the input apparatus 1 after the correction by the filter 27 (hereinafter, referred to as post-correction velocity value). The velocity values have an absolute value of 8 bits (±128).

The broken line in the graph indicates a state where a scale factor of the filter 27 is 1, that is, a state where the attenuation function of the filter 27 is not working. A line obtained when the scale factor smaller than 1 is actually applied will hereinafter be referred to as correction line A. A value having the value indicated by the broken line as a denominator and a value indicated by the correction line A as a numerator becomes the scale factor.

A first threshold value (fifth threshold value) Th1, a second threshold value (fourth threshold value) Th2, and a third threshold value Th3 are set for the pre-correction velocity value. In this example, the pre-correction velocity value of about 90 to 95 is set as the first threshold value Th1 (hereinafter, simply referred to as Th1), the pre-correction velocity value of about 70 is set as the second threshold value Th2 (hereinafter, simply referred to as Th2), and the pre-correction velocity value of about 1 to 3 is set as the third threshold value Th3 (hereinafter, simply referred to as Th3). The threshold values Th1 to Th3 can be changed as appropriate.

Further, the scale factor of the filter 27 in this example is set as follows.

With the pre-correction velocity value of 0 to Th3 and Th1 or more, the scale factor is set to 1. In other words, within these ranges, the pre-correction velocity value and the post-correction velocity value are the same.

From Th3 to Th2, the scale factor is set to gradually decrease as the pre-correction velocity value increases.

From Th2 to Th1, the scale factor is set to gradually increase as the pre-correction velocity value increases.

FIGS. 12A to 12D are graphs showing examples of frequency characteristics of the filter 27 respectively corresponding to pre-correction velocity values a to d shown in FIG. 11. It can be seen from FIGS. 12A to 12D that the scale factor is set to decrease as the pre-correction velocity value increases. Due to the frequency characteristics of the scale factor as described above, the graph shown in FIG. 11 is thus a velocity profile at a certain typical frequency (same frequency). Therefore, the correction line A of the velocity profile different for each frequency (e.g., correction lines having the same threshold values Th1, Th2, or the like but different scale factors) is set.

The control section 28 thus controls the scale factor of the filter 27 based on the velocity values of the input apparatus 1. The frequency characteristics of the scale factor of the filter 27 are set by appropriately setting a sampling cycle, a tap count, scale factor values of velocity values, and the like obtained by a moving average at the time the filter 27 is designed.

Returning to FIG. 10, after Step 103, the MPU 19 judges whether absolute values ($|V_x|$, $|V_y|$) of the velocity values ($V_x$, $V_y$) are equal to or smaller than Th1 or equal to or larger than Th3 (Step 104). In Step 104, the MPU 19 only needs to independently judge whether each of $|V_x|$ and $|V_y|$ is equal to or smaller than Th1.

However, the present embodiment is not limited thereto and a judgment may be made on whether a combined vector amount ($[V_x^2+V_y^2]^{1/2}$) of the velocity values ($|V_x|$, $|V_y|$) is equal to or smaller than Th1 or equal to or larger than Th3. Alternatively, a larger one of $|V_x|$ and $|V_y|$ may be set as a representative value of the velocity values and a judgment may be made on whether the representative value is equal to or smaller than Th1 or equal to or larger than Th3. Accordingly, power consumption as well as a calculation amount of the MPU 19 can be reduced.

When the condition of Step 104 is not satisfied, the control section 28 of the MPU 19 outputs the velocity values with the scale factor set to 1 by the velocity profile shown in FIG. 11. In other words, the MPU 19 sets the velocity values ($V_x$, $V_y$) output from the velocity calculation section 29 as ($V_x'$, $V_y'$) (Step 105) and transmits the velocity values ($V_x'$, $V_y'$) to the control apparatus 40 via the transceiver 21 (Step 108).

The MPU 35 of the control apparatus 40 receives the velocity values ($V_x'$, $V_y'$) as input information via the transceiver 38 (Step 109). The MPU 35 generates coordinate values X and Y of the pointer 2 that correspond to the velocity values $V_x'$ and $V_y'$ as shown in Equations (1) and (2) below (Step 110), and controls display so that the pointer 2 moves on the screen 3 (Step 111).

$$X(t)=X(t-1)+V_x' \quad (1)$$

$$Y(t)=Y(t-1)+V_y' \quad (2)$$

On the other hand, when the condition of Step 104 is satisfied, the control section 28 sets scale factors of the filter 27 that correspond to the absolute values of the velocity values ($|V_x|$, $|V_y|$) output from the velocity calculation section 29 as shown in FIG. 11 (Step 106). The filter 27 attenuates the absolute values ($|V_x|$, $|V_y|$) by the set scale factors and outputs ($V_x'$, $V_y'$) (Step 107), and the MPU 19 transmits the values to the control apparatus 40 (Step 108).

In this embodiment, by thus controlling the scale factor based on the signal corresponding to the movement of the casing 10, the scale factor is controlled variably in accordance with a degree (amplitude and velocity) of hand movements, for example. Thus, a pointer movement that does not cause the user to feel a phase delay can be realized.

The degree of hand movements is different for each user, so if the scale factor is determined so that hand movements of users who cause a large hand movement can be suppressed sufficiently, some of the users who cause small hand movements may feel awkwardness regarding the phase delay. By controlling the scale factor to decrease as the hand movement increases and controlling the scale factor to increase as the hand movement decreases based on the degree of hand movements, a setting for minimizing the phase delay within a range in which the hand movement becomes negligible becomes possible.

In particular, because the filter 27 dynamically attenuates the velocity values of the shake frequency range in accordance with the velocity values as the signal corresponding to the movement of the casing 10, for example, even when a vibration including a hand movement occurs in the casing 10, the user can still perform a precise pointing operation with the pointer 2 on the screen 3.

A relatively-large velocity value indicates that the user is in midst of moving the pointer 2 from a certain position on the screen 3 to a different position relatively distant therefrom. In such a case, unlike a case where a specific position on the screen 3 is targeted for the operation, the hand movement is not much of an importance and an importance is rather placed on following capability with respect to the phase delay. On the other hand, a relatively-small velocity value indicates a case where, for example, a specific icon 4 on the screen is targeted for the operation, so an importance is placed on suppression of a hand movement rather than the following capability. Due to such a correlation between the velocity and a shake acceptable amount, by monitoring the velocity values, an operational feeling of the user is improved.

Specifically, in a case where the velocity values are larger than Th1, which means that the user is in midst of moving the pointer 2 from a certain position on the screen 3 to a different position relatively distant therefrom, if the filter 27 exerts its function, the user may be feel awkwardness due to the phase delay. Therefore, the scale factor is set to 1 so that the user will not feel the phase delay.

Further, the velocity values that are smaller than Th3, that is, extremely-small velocity values indicate a time when the user has almost completely stopped the input apparatus 1, an instant when the user starts moving the input apparatus 1 from a stopped state, or an instant when the input apparatus 1 is stopped from the moved state. Therefore, also in this case, for preventing the phase delay, the scale factor is set to 1 for preventing the phase delay. This is because, particularly at an instant when the user starts moving the input apparatus 1 from the stopped state, the user tends to feel awkwardness due to the phase delay.

Moreover, the control section 28 controls the scale factor so that, as shown in FIG. 11, the scale factor gradually decreases until the velocity value that has exceeded Th3 reaches Th2 and gradually increases until the velocity value that has exceeded Th2 reaches Th1. It is considered that in the velocity range of Th1 or less in which a hand movement occurs, until the velocity value that has exceeded Th3 reaches Th2, the hand movement amount increases as the velocity value increases. Therefore, by controlling the scale factor to gradually decrease as the velocity value increases in this range, awkwardness for the user can be eliminated. It is also considered that the hand movement amount becomes smaller as the velocity value increases after reaching Th2. Therefore, by controlling the scale factor to gradually increase until the velocity value that has exceeded Th2 reaches Th1, awkwardness in operation for the user can be eliminated.

FIGS. 13A to 13C are graphs showing other embodiments of the velocity profile shown in FIG. 11.

Figure 13:
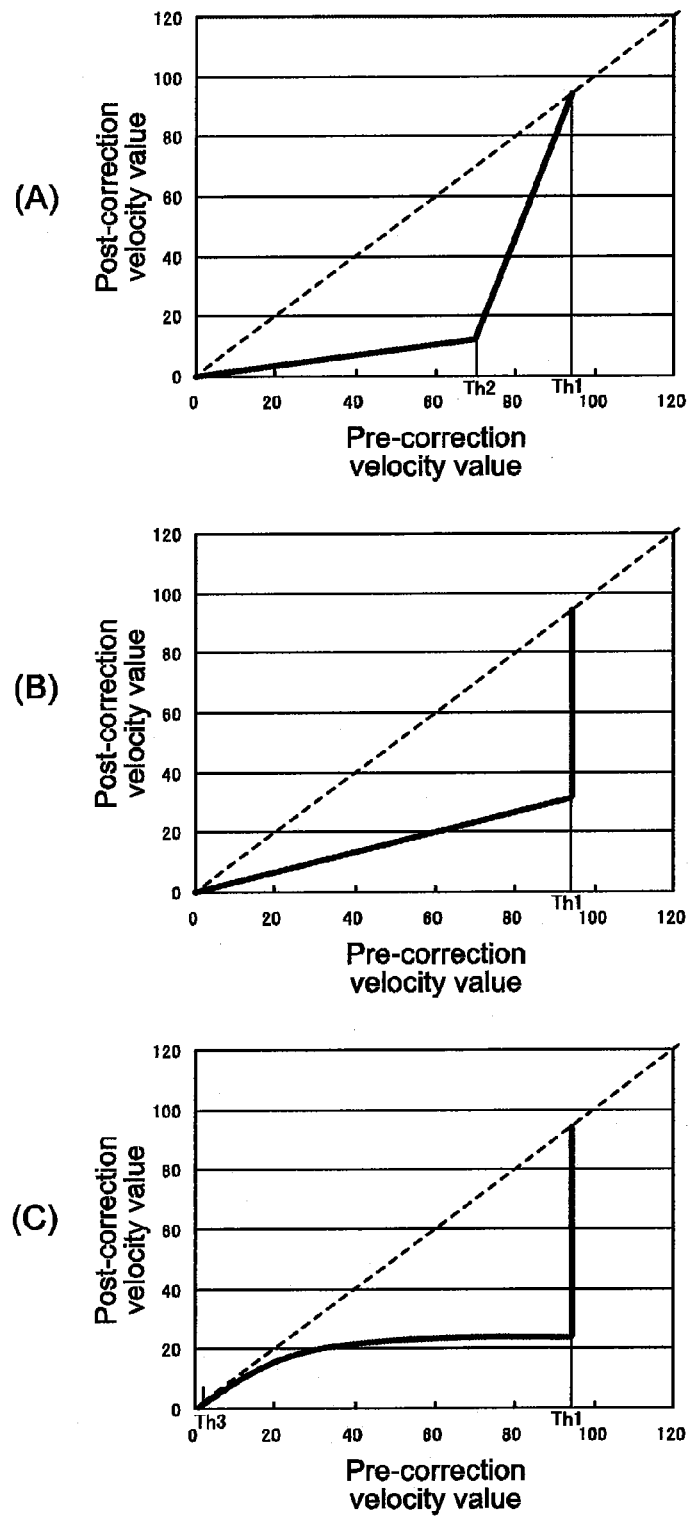
FIG. 13 Graphs showing other embodiments of the velocity profile shown in FIG. 11.

FIG. 13A shows an example where Th2 and Th1 are set and not Th3. FIG. 13B shows an example where Th1 is set and not Th3 and Th2. FIG. 13C shows an example where Th3 and Th1 are set and not Th2. Also in these cases, the filter 27 of FIGS. 13A to 13C includes a velocity profile different for each frequency as described in FIG. 13.

Alternatively, although not shown, a velocity profile including a correction line obtained by connecting four or more threshold values may be set.

Figure 14:
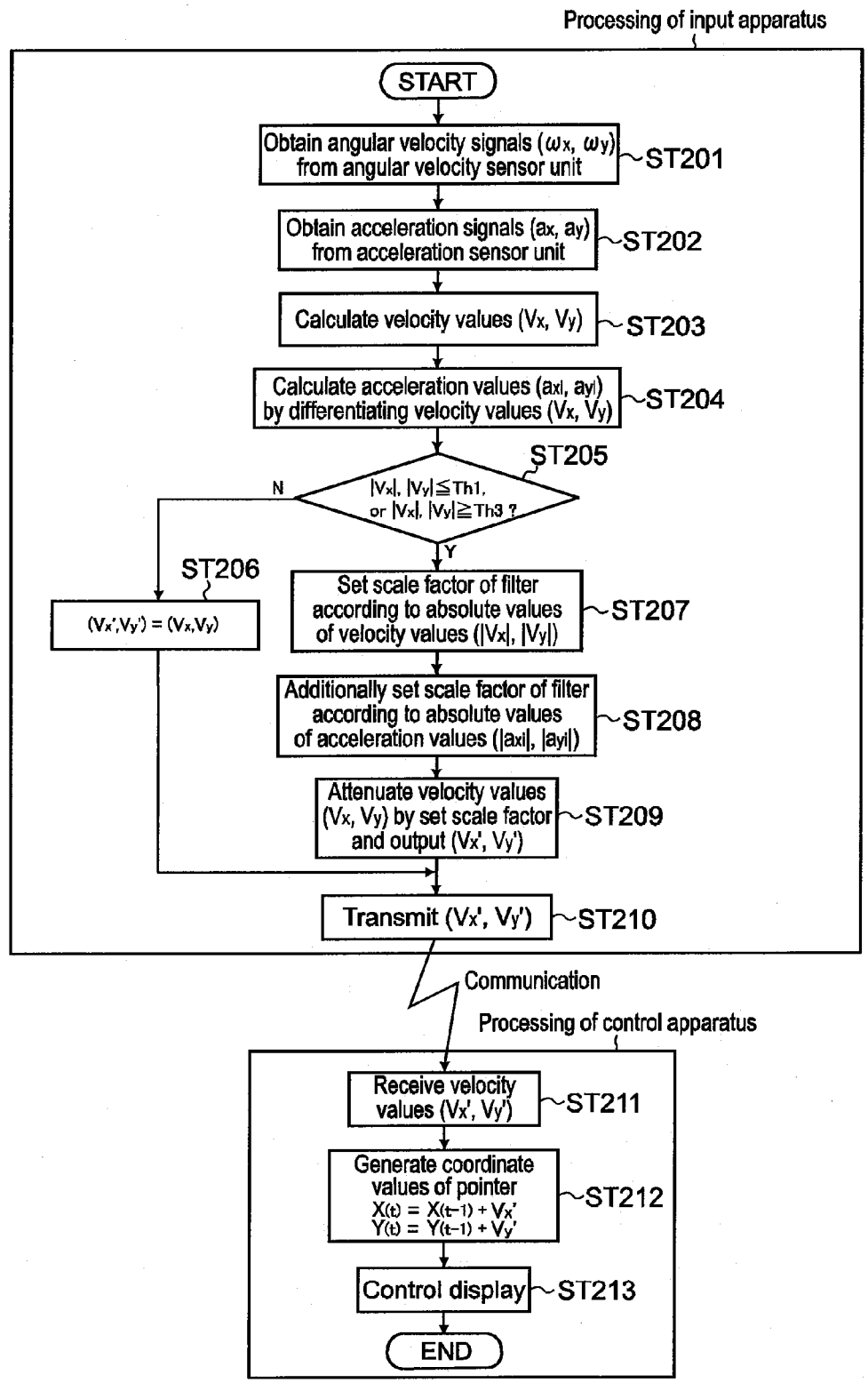
FIG. 14 A flowchart showing an operation of the control system according to an embodiment different from that of the operation shown in FIG. 10.

FIG. 14 is a flowchart showing an operation of the control system according to an embodiment different from that of the operation shown in FIG. 10.

Processes of Steps 201 to 203 are the same as those of Steps 101 to 103 shown in FIG. 10.

In Step 204, the MPU 19 differentiates the velocity values $(V_x, V_y)$ obtained in Step 203 to thus output acceleration values $(a_{xi}, a_{yi})$ in the X'- and Y'-axis directions.

Processes of Steps 205 to 207 are the same as those of Steps 104 to 106.

FIG. 15A is a graph showing the velocity profile as characteristics of the filter 27 used in this embodiment. This graph is also a profile of a typical frequency within the shake frequency range (e.g., 10 Hz). In the filter 27, the profile is variable according to absolute values $(|a_{xi}|, |a_{yi}|)$ of the acceleration values $(a_{xi}, a_{yi})$. The scale factor increases (approaches 1) as the acceleration value increases, and the scale factor decreases as the acceleration value decreases.

Alternatively, the velocity profile of the filter 27 may be a graph as shown in FIG. 15B. In FIG. 15B, as compared to FIG. 15A, a rate by which the scale factor decreases from the pre-correction velocity value of 0 to Th2 and a rate by which the scale factor increases from Th2 to Th3 are lowered.

FIGS. 16A to 16E are graphs showing scale factor frequency characteristics respectively corresponding to velocity profiles a to e shown in FIG. 15B.

Let us go back to the description on FIG. 14. In Step 208, the control section 28 of the MPU 19 dynamically controls the scale factor of the filter 27 in accordance with the absolute values of the calculated acceleration values $(|a_{xi}|, |a_{yi}|)$, that is, using the velocity profiles of FIG. 15A or 15B. The scale factor control is typically carried out successively on the acceleration values. In other words, the scale factor is controlled by a predetermined operation that is based on the acceleration values.

However, it is also possible that information on the velocity profile that corresponds to each of the acceleration values (or a predetermined range of accelerations values) be stored in the memory 26 or the like in advance and the MPU 19 dynamically read out the information in accordance with the acceleration values. In this case, the number of velocity profiles only needs to be two or more.

Processes of Steps 209 to 213 are the same as those of Steps 107 to 111.

As described above, because the scale factor is controlled based on both the velocity values and the acceleration values in the operation shown in FIG. 14, an operational feeling for the user is improved. It is considered that the hand movement amount becomes smaller as the acceleration value increases. In other words, due to a correlation between the acceleration value and the hand movement amount, the operational feeling for the user can be improved by monitoring the acceleration value.

Figure 17:
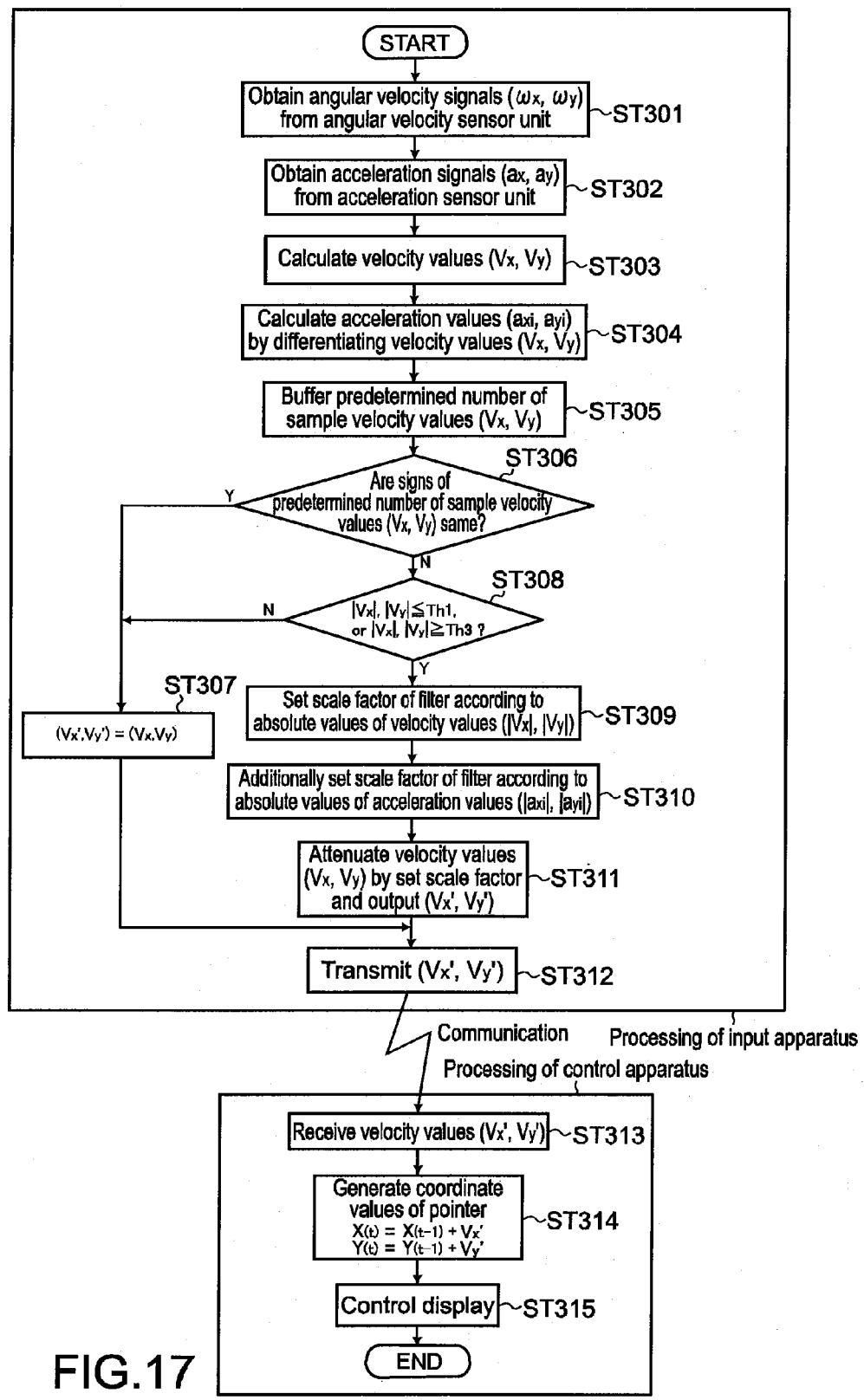
FIG. 17 A flowchart showing an operation of the control system according to another embodiment.

FIG. 17 is a flowchart showing an operation of the control system according to still another embodiment.

Processes of Steps 301 to 304 are the same as those of Steps 201 to 204 shown in FIG. 14.

In Step 305, the MPU 19 stores in the memory 26 a predetermined number of temporally-consecutive velocity values (sample velocity values) $(V_x, V_y)$ calculated in Step 303 (Step 305). The number of samples of the velocity values to be stored in the memory 26 is set as appropriate. In this case, a ring buffer or a FIFO (First In First Out) is typically used for the memory 26, though not limited thereto.

The MPU 19 judges whether signs of the predetermined number of stored sample velocity values are all the same (sign judgment means) (Step 306). When the signs are the same, the MPU 19 advances to Step 307. Processes of Steps 307 and 312 to 315 are the same as those of Steps 105 and 108 to 111 shown in FIG. 10. In other words, when the signs of the sample velocity values are all the same, a velocity direction has not changed during a sampling period of the plurality of velocity values. Therefore, in this case, it can be considered that the user is in midst of moving the pointer from a certain position on the screen to a different position relatively distant therefrom. If the filter 27 exerts its function in this case, the user may feel awkwardness due to a phase delay. Therefore, it is only necessary that the function of attenuating the velocity values be stopped or weakened.

In a case where there are one or more sample velocity values having different signs among the predetermined number of sample velocity values stored in the memory 26, the MPU 19 advances to processes of Step 308 and subsequent steps. The processes of Steps 308 and 309 to 311 are the same as those of Steps 205 and 207 to 209 shown in FIG. 14. In other words, it can be considered that when one or more sample velocity values having different signs are stored, the velocity direction has changed during the sampling period of the plurality of velocity values, meaning that a hand movement has occurred. Therefore, by executing the processes of Step 308 and subsequent steps, an influence of a hand movement can be removed.

In the operation shown in FIG. 17, the acceleration values $(a_{xi}, a_{yi})$ have been calculated in Step 304 as in the operation shown in FIG. 14, and the scale factors have been controlled in accordance with the absolute values $(|a_{xi}|, |a_{yi}|)$ thereof in Step 310. However, the operation shown in FIG. 17 may be an operation in which the acceleration values are not calculated as in the operation shown in FIG. 10, that is, processing without Steps 304 and 310.

Figure 18:
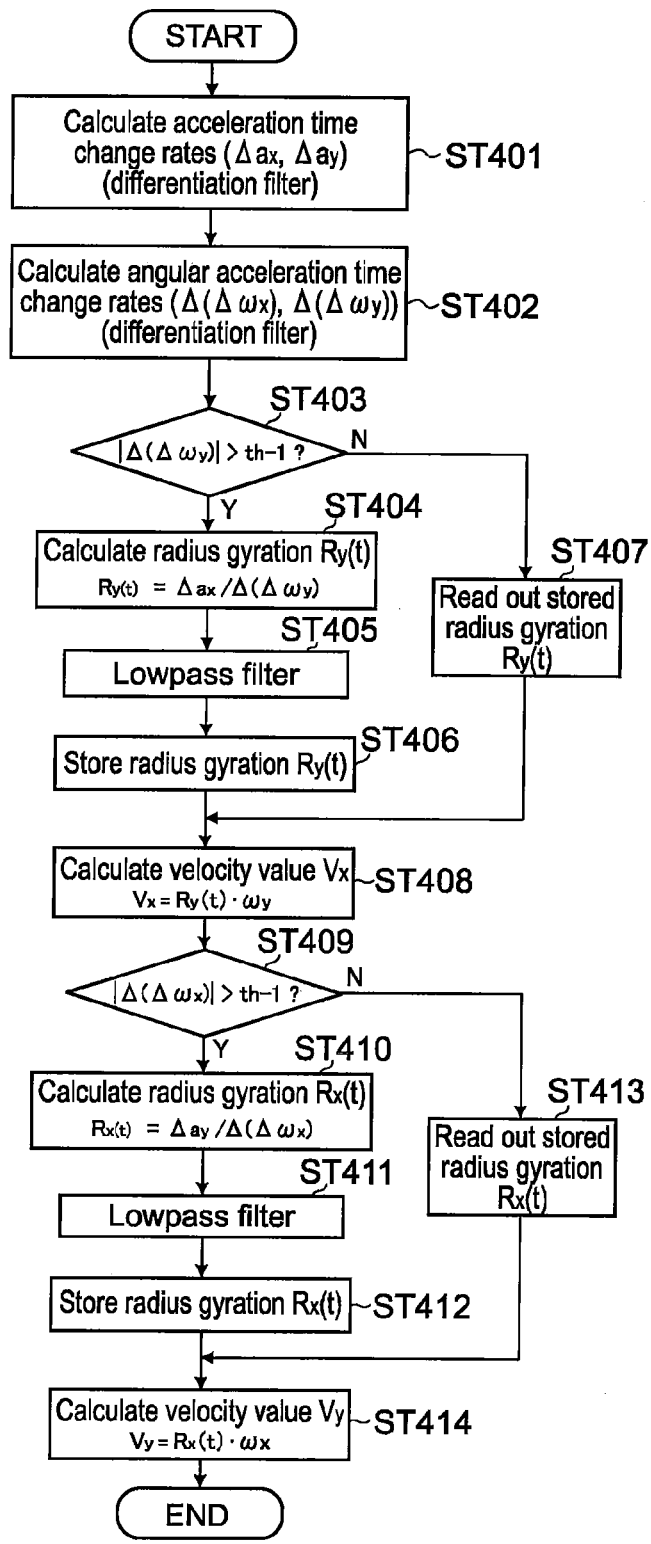
FIG. 18 A flowchart showing an operation according to an embodiment of a method of calculating velocity values in Steps 103, 203, and 303 shown in FIGS. 10, 14, and 17.
Figure 19:
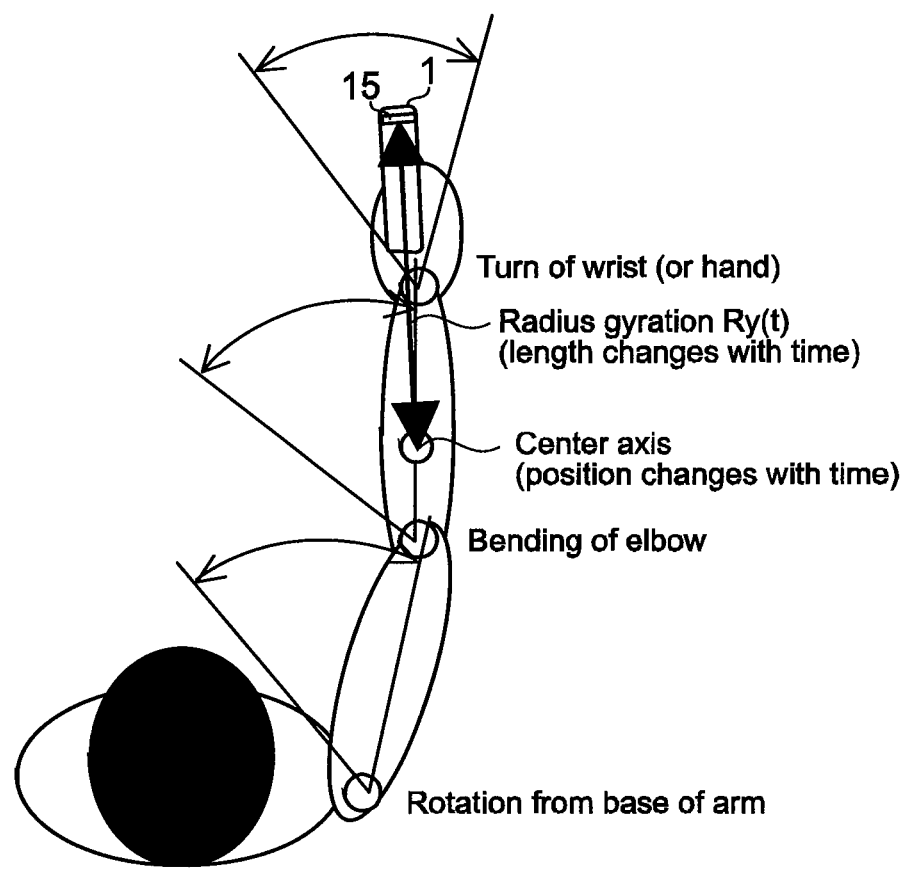
FIG. 19 A diagram for illustrating a basic idea of the method of calculating velocity values in FIG. 18.

Next, a calculation method of the velocity values $(V_x, V_y)$ in Steps 103, 203, and 303 respectively shown in FIGS. 10, 14, and 17 will be described. FIG. 18 is a flowchart showing an operation of the input apparatus 1. FIG. 19 is a diagram for illustrating a basic idea of the velocity value calculation method.

FIG. 19 is a top view of the user operating the input apparatus 1 by swinging it in, for example, a lateral direction (yaw direction). As shown in FIG. 19, when the user operates the input apparatus 1 naturally, an operation is made by using at least one of a turn of a wrist (or hand), a bending of an elbow, and a rotation from a base of an arm. Therefore, a comparison between the movement of the input apparatus 1 and the rotations of a wrist (or hand), elbow, and base of an arm shows that there exist relationships of 1 and 2 below.

1. The angular velocity value $\omega_y$ of the input apparatus 1 about the Y' axis is a combined value of an angular velocity obtained by the rotation of a shoulder, an angular velocity obtained by the bending of an elbow, an angular velocity obtained by the turn of a hand (or wrist), and the like.

2. The velocity value $V_x$ of the input apparatus 1 in the X'-axis direction is a combined value of values obtained by respectively multiplying the angular velocities of the shoulder, elbow, hand, and the like by a distance between the shoulder and the input apparatus 1, a distance between the elbow and the input apparatus 1, a distance between the hand and the input apparatus 1, and the like.

Here, regarding a rotational movement of the input apparatus 1 in a minute time, the input apparatus 1 can be considered to be rotating about a center axis parallel to the Y' axis and whose position changes with time. Assuming that a distance between the center axis whose position changes with time and the input apparatus 1 is a radius gyration $R_y(t)$ about the Y' axis, the relationship between the velocity value $V_x$ and the angular velocity value $\omega_y$ of the input apparatus 1 can be expressed by Equation (3) below. In other words, the velocity value $V_x$ in the X'-axis direction becomes a value obtained by multiplying the angular velocity value $\omega_y$ about the Y' axis by the distance $R_y(t)$ between the center axis and the input apparatus 1.

$$V_x = R_y(t) * \omega_y \qquad (3)$$

As shown in Equation (3), the relationship between the velocity value and the angular velocity value of the input apparatus 1 is a proportional relationship, that is, a correlation with R(t) as a proportional constant.

Equation (3) above is modified to obtain Equation (4).

$$R_y(t) = V_x / \omega_y \qquad (4)$$

The right-hand side of Equation (4) is a velocity dimension. Even when the velocity value and the angular velocity value represented on the right-hand side of Equation (4) are differentiated to obtain a dimension of the acceleration or acceleration time change rate, the correlation is not lost. Similarly, even when the velocity value and the angular velocity value are integrated to obtain a displacement dimension, the correlation is not lost.

Therefore, with the velocity and the angular velocity represented on the right-hand side of Equation (4) as a dimension of the acceleration and acceleration time change rate, Equations (5), (6), and (7) below can be obtained.

$$R_y(t) = x / \theta_y \qquad (5)$$

$$R_y(t) = a_x / \Delta\omega_y \qquad (6)$$

$$R_y(t) = \Delta a_x / \Delta(\Delta\omega_y) \qquad (7)$$

Focusing on Equation (6) out of Equations (4), (5), (6), and (7) above, for example, it can be seen that the radius gyration $R_y(t)$ can be obtained if the acceleration value $a_x$ and the angular acceleration value $\Delta\omega_y$ are known.

As described above, the first acceleration sensor 161 detects the acceleration value $a_x$ in the X'-axis direction, and the first angular velocity sensor 151 detects the angular velocity value $\omega_y$ about the Y' axis. Therefore, if the angular velocity value $\omega_y$ about the Y' axis is differentiated and the angular acceleration value $\Delta\omega_y$ about the Y' axis is thus calculated, the radius gyration $R_y(t)$ about the Y' axis can be obtained.

If the radius gyration $R_y(t)$ about the Y' axis is known, the velocity value $V_x$ of the input apparatus 1 in the X'-axis direction can be obtained by multiplying the radius gyration $R_y(t)$ by the angular velocity value $\omega_y$ about the Y' axis detected by the first angular velocity sensor 151 (see Equation (3)). Specifically, a rotational operation amount itself of the user is converted into a linear velocity value in the X'-axis direction, thus obtaining a velocity value that matches an intuition of the user.

This velocity value calculation method can also be applied in a case where the user operates the input apparatus 1 by swinging it in the vertical direction (pitch direction).

An example where Equation (7) is used will be described with reference to FIG. 18. Referring to FIG. 18, the MPU 19 of the input apparatus 1 carries out a differentiation operation on the obtained acceleration values ($a_x$, $a_y$) using a differentiation filter and the like. Accordingly, acceleration time change rates ($\Delta a_x$, $\Delta a_y$) are calculated (Step 401). Similarly, the MPU 19 carries out a second-order differentiation operation on the obtained angular acceleration values ($\omega_x$, $\omega_y$) to calculate angular velocity time change rates ($\Delta(\Delta\omega_x)$), $\Delta(\Delta\omega_y)$) (Step 402).

Upon calculating the angular acceleration time change rates, the MPU 19 judges whether an absolute value of the angular acceleration time change rate $|\Delta(\Delta\omega_y)|$ about the Y' axis exceeds a threshold value th−1 (Step 403). When $|\Delta(\Delta\omega_y)|$ above exceeds the threshold value th−1, the MPU 19 calculates the radius gyration $R_y(t)$ about the Y' axis by dividing the acceleration time change rate $\Delta a_x$ in the X'-axis direction by the angular acceleration time change rate $\Delta(\Delta\omega_y)$ about the Y' axis (Step 404). In other words, a ratio of the acceleration time change rate $\Delta a_x$ in the X'-axis direction to the angular acceleration time change rate $\Delta(\Delta\omega_y)$ about the Y' axis is calculated as the radius gyration $R_y(t)$ (Equation (7)). The threshold value th−1 of $|\Delta(\Delta\omega_y)|$ can be set as appropriate.

A signal of the radius gyration $R_y(t)$ is passed through a lowpass filter, for example (Step 405). Information on the radius gyration $R_y(t)$ from which noises of a high-frequency range have been removed by the lowpass filter is stored in the memory (Step 406). The memory updates the signal of the radius gyration $R_y(t)$ every predetermined clocks and stores it.

By multiplying the radius gyration $R_y(t)$ by the angular velocity value $\omega_y$ about the Y' axis, the MPU 19 of the input apparatus 1 calculates the velocity value $V_x$ in the X'-axis direction (Step 408).

On the other hand, when $|\Delta(\Delta\omega_y)|$ above is equal to or smaller than the threshold value th−1, the MPU 19 reads out the radius gyration $R_y(t)$ stored in the memory (Step 407). By multiplying the read-out radius gyration $R_y(t)$ by the angular velocity value $\omega_y$ about the Y' axis, the velocity value $V_x$ in the X'-axis direction is calculated (Step 408).

There are the following two reasons for carrying out the processes of Steps 401 to 408.

One is to obtain the radius gyration $R_y(t)$ of Equation (7) above to thus obtain a linear velocity that matches the intuition of the user.

Second is to remove the gravitational effect as described above. As described above, when the input apparatus 1 is tilted in the roll direction or the pitch direction from its reference position, for example, detection signals different from the actual movement of the input apparatus 1 are inadvertently output due to the gravitational effect. When the initial position is tilted in the roll direction as described above, for example, gravity acceleration component values are output from the acceleration sensors 161 and 162 of the acceleration sensor unit 16. Therefore, when the effect of the gravity acceleration component values is not removed, the movement of the pointer 2 becomes a movement that does not match a sense of the user.

Figure 20:
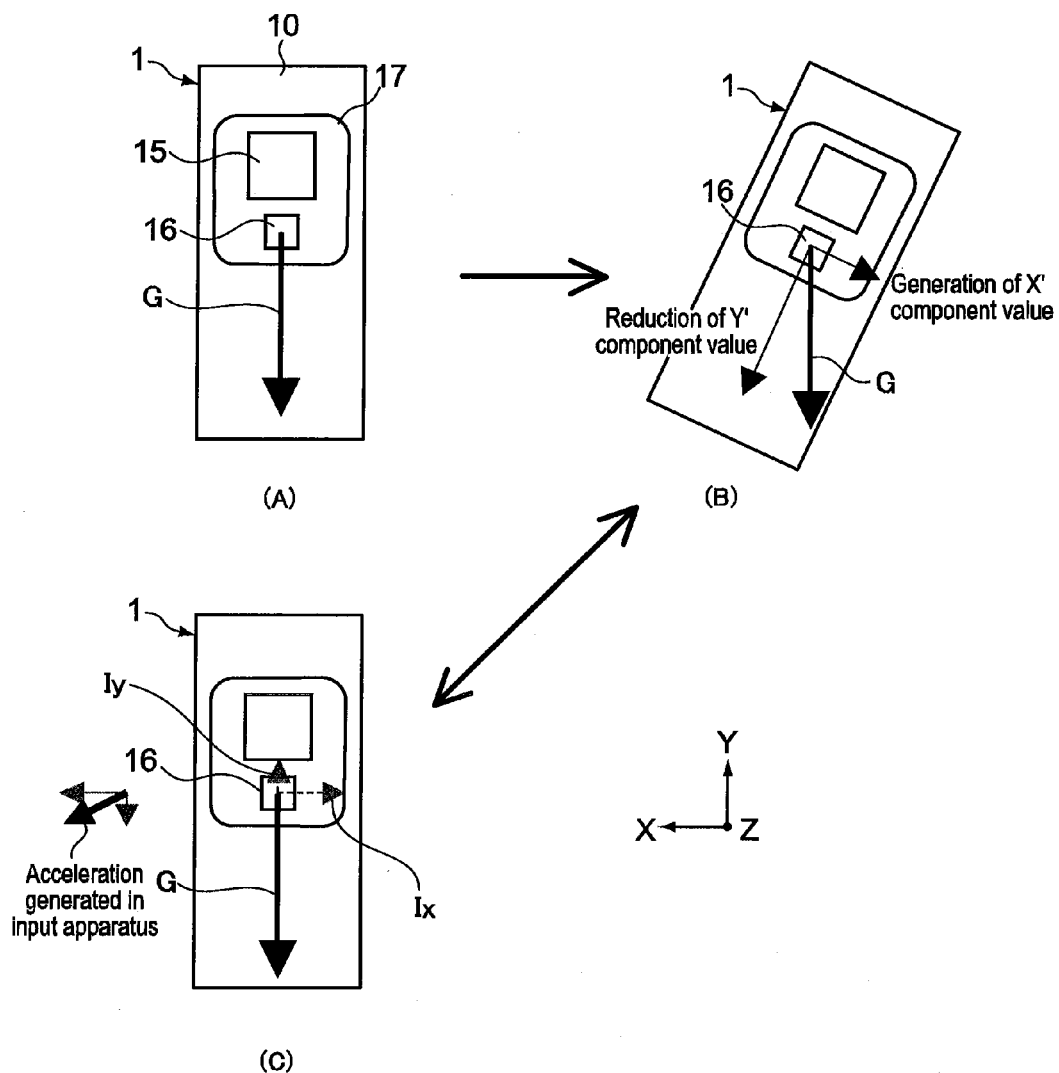
FIG. 20 Diagrams for illustrating a gravitational effect with respect to an acceleration sensor unit.
Figure 21:
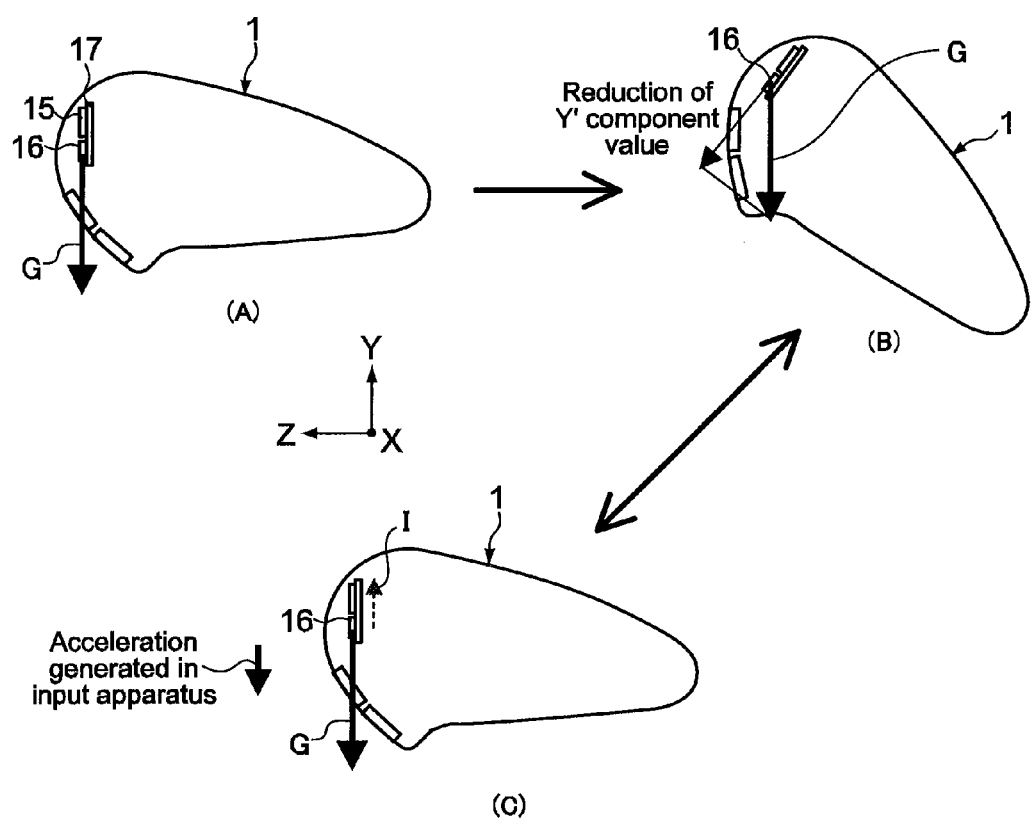
FIG. 21 Other diagrams for illustrating the gravitational effect with respect to the acceleration sensor unit.

This will be described in a more easy-to-understand manner. FIGS. 20 and 21 are explanatory diagrams therefor. FIG. 20 are diagrams showing the input apparatus 1 seen from the Z direction. FIG. 21 are diagrams showing the input apparatus 1 seen from the X direction.

In FIG. 20A, the input apparatus 1 is in the reference position and is held still. At this time, an output of the first acceleration sensor 161 is substantially 0, and an output of the second acceleration sensor 162 is an output corresponding to a gravity acceleration G. However, as shown in FIG. 20B, for example, in a state where the input apparatus 1 is tilted in the roll direction, the first and second acceleration sensors 161 and 162 respectively detect acceleration values of tilt components of the gravity acceleration G.

In this case, the first acceleration sensor 161 detects an acceleration in the X'-axis direction even when the input apparatus 1 is not actually moved in the X'-axis direction in particular. The state shown in FIG. 20B is equivalent to a state where, when the input apparatus 1 is in the reference position as shown in FIG. 20C, the acceleration sensor unit 16 has received inertial forces Ix and Iy as respectively indicated by arrows with broken lines, thus being undistinguishable by the acceleration sensor unit 16. As a result, the acceleration sensor unit 16 judges that an acceleration in a downward left-hand direction as indicated by an arrow F is applied to the input apparatus 1 and outputs a detection signal different from the actual movement of the input apparatus 1. In addition, because the gravity acceleration G constantly acts on the acceleration sensor unit 16, an integration value is increased and an amount by which the pointer 2 is displaced in the downward oblique direction is increased at an accelerating pace. When the state is shifted from that shown in FIG. 20A to that shown in FIG. 20B, it is considered that inhibition of the movement of the pointer 2 on the screen 3 is an operation that intrinsically matches the intuition of the user.

The same holds true also when the input apparatus 1 is rotated in the pitch direction from the reference position as shown in FIG. 21A to tilt as shown in FIG. 21B, for example. In such a case, because the gravity acceleration G detected by the second acceleration sensor 162 at the time the input apparatus 1 is in the reference position decreases, it is difficult for the input apparatus 1 to make a distinguishment from the inertial force I in the pitch direction as shown in FIG. 21C.

In this regard, a fact that a time change rate of the gravity acceleration component value generated by the movement of the input apparatus 1 is smaller than a time change rate of the acceleration value that focuses only on the movement of the input apparatus 1 caused by the operation of the user is used. The time change rate of the gravity acceleration component value is a 1/10 order of the time change rate of the acceleration value that focuses only on the movement of the input apparatus 1 caused by the operation of the user. The value output from the acceleration sensor unit 16 is a value obtained by combining those two. In other words, the signal output from the acceleration sensor unit 16 is a signal obtained by superimposing a DC component value as the gravity acceleration component value on the time change rate of the acceleration value that focuses only on the movement of the input apparatus 1 caused by the operation of the user.

Therefore, by carrying out the differentiation operation on the acceleration values in Step 401, the acceleration time change rates can be obtained. Accordingly, the time change rates of the gravity acceleration component values are removed. As a result, even in a case where a change in a component force of the gravity acceleration due to the tilt of the input apparatus 1 occurs, the radius gyrations can be obtained appropriately, and appropriate velocity values can be calculated from the radius gyrations. It should be noted that there are cases where, in addition to the gravity acceleration component values, the DC component value contains, for example, a DC component due to a temperature drift of the acceleration sensor unit 16.

Moreover, because Equation (7) is used in this embodiment, in Step 402, a second-order differentiation is carried out on the angular velocity value $\omega_y$, and noises of a high-frequency range are superimposed on the operational value of the angular velocity. Though there is no problem when $|\Delta(\Delta\omega_y)|$ is large, when small, an S/N ratio deteriorates. When $|\Delta(\Delta\omega_y)|$ with a deteriorated S/N ratio is used in the calculation of $R_y(t)$ in Step 404, precision of $R_y(t)$ and the velocity value $V_x$ is lowered.

In this regard, in Step 403, the angular acceleration time change rate $\Delta(\Delta\omega_y)$ about the Y' axis calculated in Step 402 is used. When $\Delta(\Delta\omega_y)$ is equal to or smaller than the threshold value th−1, the radius gyration $R_y(t)$ previously stored in the memory and that has less noise is read out (Step 407), and the read-out radius gyration $R_y(t)$ is used in calculating the velocity value $V_x$ in Step 408.

In Steps 409 to 414, the MPU 19 calculates the velocity value $V_y$ in the Y-axis direction in the same manner as in the processes of Steps 403 to 408 above. In other words, the MPU 19 judges whether the absolute value of the angular acceleration time change rate $|\Delta(\Delta\omega_x)|$ about the X' axis exceeds the threshold value th−1 (Step 409), and when exceeding the threshold value th−1, calculates the radius gyration $R_x(t)$ about the X' axis using the angular velocity time change rate (Step 410).

A signal of the radius gyration $R_x(t)$ is passed through the lowpass filter (Step 411) and stored in the memory (Step 412). When equal to or smaller than the threshold value th−1, the radius gyration $R_x(t)$ stored in the memory is read out (Step 413), and the velocity value $V_y$ in the Y'-axis direction is calculated based on the radius gyration $R_x(t)$ (Step 414).

It should be noted that although the same threshold value th−1 is used in both the yaw direction and the pitch direction in this embodiment, different threshold values may be used for those directions.

In Step 403, it is also possible to judge the angular acceleration value ($\Delta\omega_y$) based on the threshold value, instead of $\Delta(\Delta\omega_y)$. Also in Step 409, it is possible to judge the angular acceleration value ($\Delta\omega_x$) based on the threshold value, instead of $\Delta(\Delta\omega_x)$. In the flowchart shown in FIG. 18, Equation (7) has been used for calculating the radius gyration R(t). However, because the angular acceleration values ($\Delta\omega_x$, $\Delta\omega_y$) are calculated when using Equation (6), the angular acceleration values ($\Delta\omega_x$, $\Delta\omega_y$) may be judged based on the threshold value.

Figure 22:
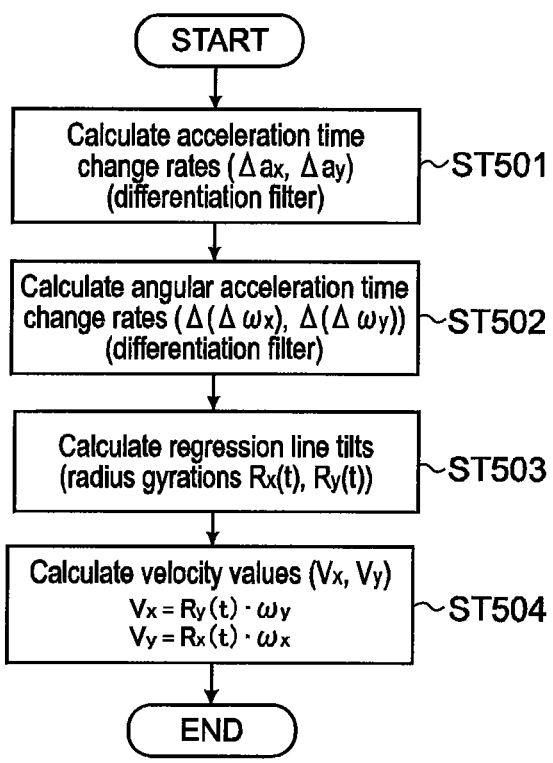
FIG. 22 A flowchart showing an operation according to another embodiment of a method of calculating radius gyrations shown in FIG. 18.

Next, another embodiment of the calculation method of the radius gyrations ($R_x(t)$, $R_y(t)$) described heretofore will be described. FIG. 22 is a flowchart showing an operation of the input apparatus 1 at that time.

In this embodiment, a tilt of a regression line is used to calculate the radius gyration. As described above, the radius gyration is a ratio of the acceleration change rate to the angular acceleration change rate. For calculating the ratio of the acceleration change rate to the angular acceleration change rate, this embodiment uses the tilt of the regression line.

The MPU 19 subjects the acceleration values ($a_x$, $a_y$) and the angular velocity values ($\omega_y$, $\omega_y$) to a first-order differentiation and second-order differentiation, to thus calculate the acceleration change rates ($\Delta a_x$, $\Delta a_y$) and the angular acceleration change rates ($\Delta(\Delta\omega_x)$, $\Delta(\Delta\omega_y)$) (Steps 501 and 502). A history of n pairs of acceleration change rates ($\Delta a_x$, $\Delta a_y$) and angular acceleration change rates ($\Delta(\Delta\omega_x)$, $\Delta(\Delta\omega_y)$) are stored in the memory, for example, and regression line tilts ($A_1$, $A_2$) are respectively calculated using Equations (8) and (9) below (Step 503). The regression line tilts are ratios of the acceleration change rates to the angular acceleration change rates, that is, the radius gyrations ($R_x(t)$, $R_y(t)$). It should be noted that as a reference, methods of calculating regression line segments ($B_1$, $B_2$) are respectively expressed by Equations (10) and (11).

$$A_1 = R_x(t) = [\{\Sigma(\Delta(\Delta\omega_{xj}))^2\} * \Sigma(\Delta a_{yj})^2\} - \{\Sigma\Delta(\Delta\omega_{xj}) * \Sigma\Delta(\Delta\omega_{xj}) * \Delta a_{yj}\}] / [n * \Sigma(\Delta(\Delta\omega_{xj}))^2 - \{\Sigma\Delta(\Delta\omega_{xj})\}^2] \quad (8)$$

$$A_2 = R_y(t) = [\{\Sigma(\Delta(\Delta\omega_{yj}))^2 * \Sigma(\Delta a_{xj})^2\} - \{\Sigma\Delta(\Delta\omega_{yj}) * \Sigma\Delta(\Delta\omega_{yj}) * \Delta a_{xj}\}] / [n * \Sigma(\Delta(\Delta\omega_{yj}))^2 - \{\Sigma\Delta(\Delta\omega_{yj})\}^2] \quad (9)$$

$$B_1 = [\{n * \Sigma\Delta(\Delta\omega_{xj}) * \Delta a_{yj}\} - \{\Sigma\Delta(\Delta\omega_{xj}) * \Sigma\Delta a_{yj}\}] / [n * \Sigma(\Delta(\Delta\omega_{xj}))^2 - \{\Sigma\Delta(\Delta\omega_{xj})\}^2] \quad (10)$$

$$B_2 = [\{n * \Sigma\Delta(\Delta\omega_{yj}) * \Delta a_{xj}\} - \{\Sigma\Delta(\Delta\omega_{yj}) * \Sigma\Delta a_{xj}\}] / [n * \Sigma(\Delta(\Delta\omega_{yj}))^2 - \{\Sigma\Delta(\Delta\omega_{yj})\}^2] \quad (11)$$

In Equations (8) to (11) above, n represents a sampling count of the acceleration values ($\Delta a_x$, $\Delta a_y$) and angular acceleration change rates ($\Delta(\Delta\omega_x)$, $\Delta(\Delta\omega_y)$). The sampling count n is set as appropriate so that operational errors are minimized.

Upon calculating the radius gyrations, the velocity values are calculated based on the radius gyrations as in Steps 408 to 414 of FIG. 18 (Step 504).

It should be noted that it is also possible to suppress the effect of high-frequency noises by subjecting the radius gyration signals or signals of the velocity values to the lowpass filter.

In this embodiment, by calculating the regression line tilts as the radius gyrations, more accurate radius gyrations and velocity values ($V_x$, $V_y$) can be calculated. Therefore, the movement of the pointer 2 displayed on the screen 3 can be made a more natural movement that matches the intuition of the user.

In the descriptions above, the method of calculating the regression line tilts in the dimension of the acceleration change rates and angular acceleration change rates has been described. However, the present invention is not limited thereto, and the regression line tilts may be calculated in the dimension of displacements and angles, velocities and angular velocities, or accelerations and angular accelerations.

Heretofore, the input apparatus 1 has carried out the main operations to calculate the velocity values ($V_x$, $V_y$). In an embodiment shown in FIG. 23, the control apparatus 40 carries out the main operations. An operation shown in FIG. 23 corresponds to that of FIG. 10.

The input apparatus 1 transmits to the control apparatus 40 the biaxial acceleration values and biaxial angular velocity values output from the sensor unit 17 as input information, for example (Step 703). The MPU 35 of the control apparatus 40 receives the input information (Step 704) and carries out the same processes as Steps 103 to 107, 110, and 111 (Steps 705 to 711). The methods described using FIGS. 18 to 22 may be used for the method of calculating the velocity values in Step 705.

Figure 23:
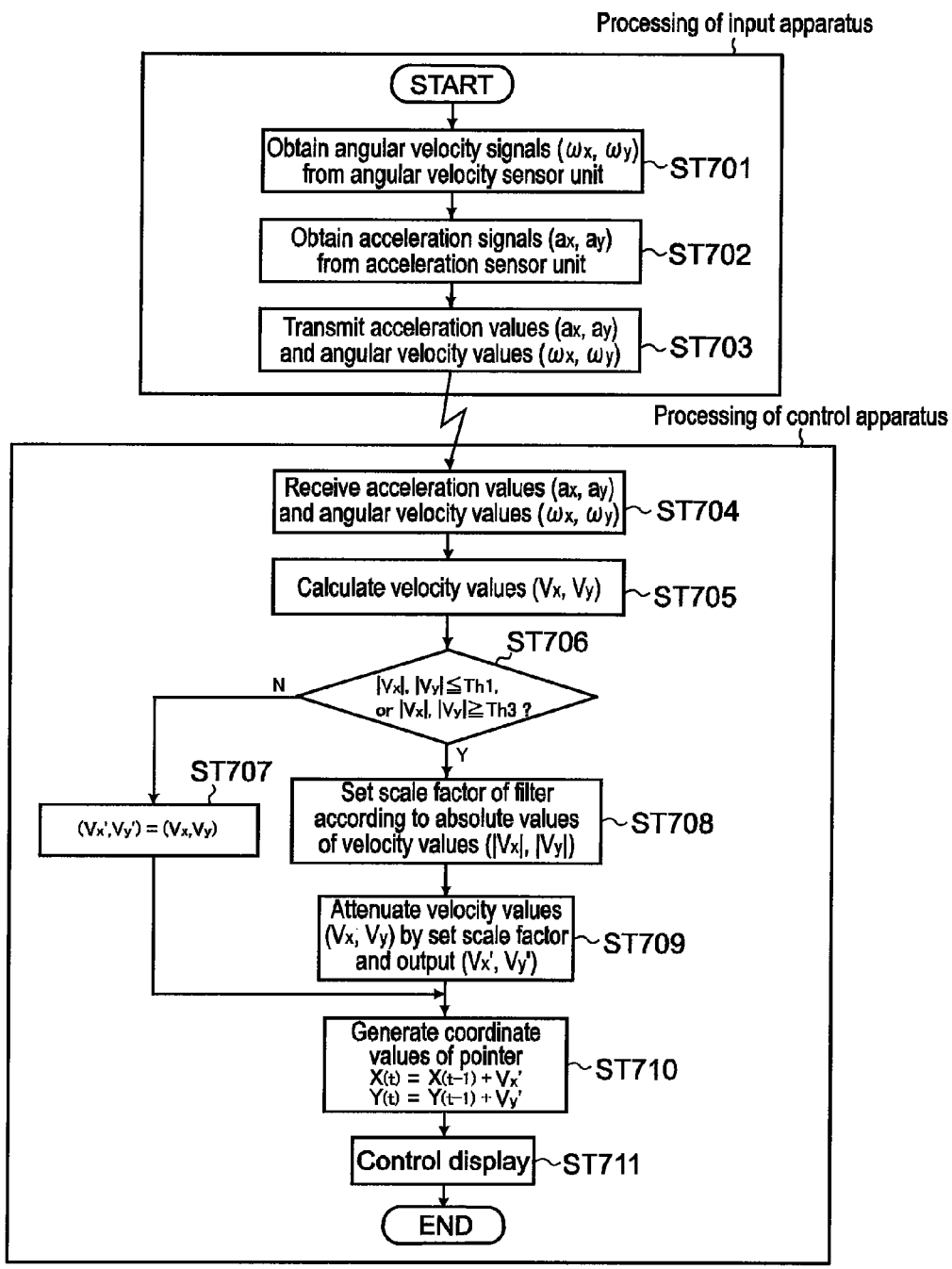
FIG. 23 A flowchart showing an operation of the control system that corresponds to FIG. 10 in a case where a control apparatus carries out main operations.

The operation corresponding to that of FIG. 10 has been exemplified in FIG. 23. However, the present invention is not limited thereto, and based on the same idea as in the operation of FIG. 23, the control apparatus 40 may execute the processes of Step 203 and subsequent steps in FIG. 14 or the processes of Step 303 and subsequent steps in FIG. 17.

Heretofore, the description has been given on the case where the scale factors are controlled dynamically based on the velocity values. Next, an embodiment in which the scale factors are controlled statically will be described.

Figure 24:
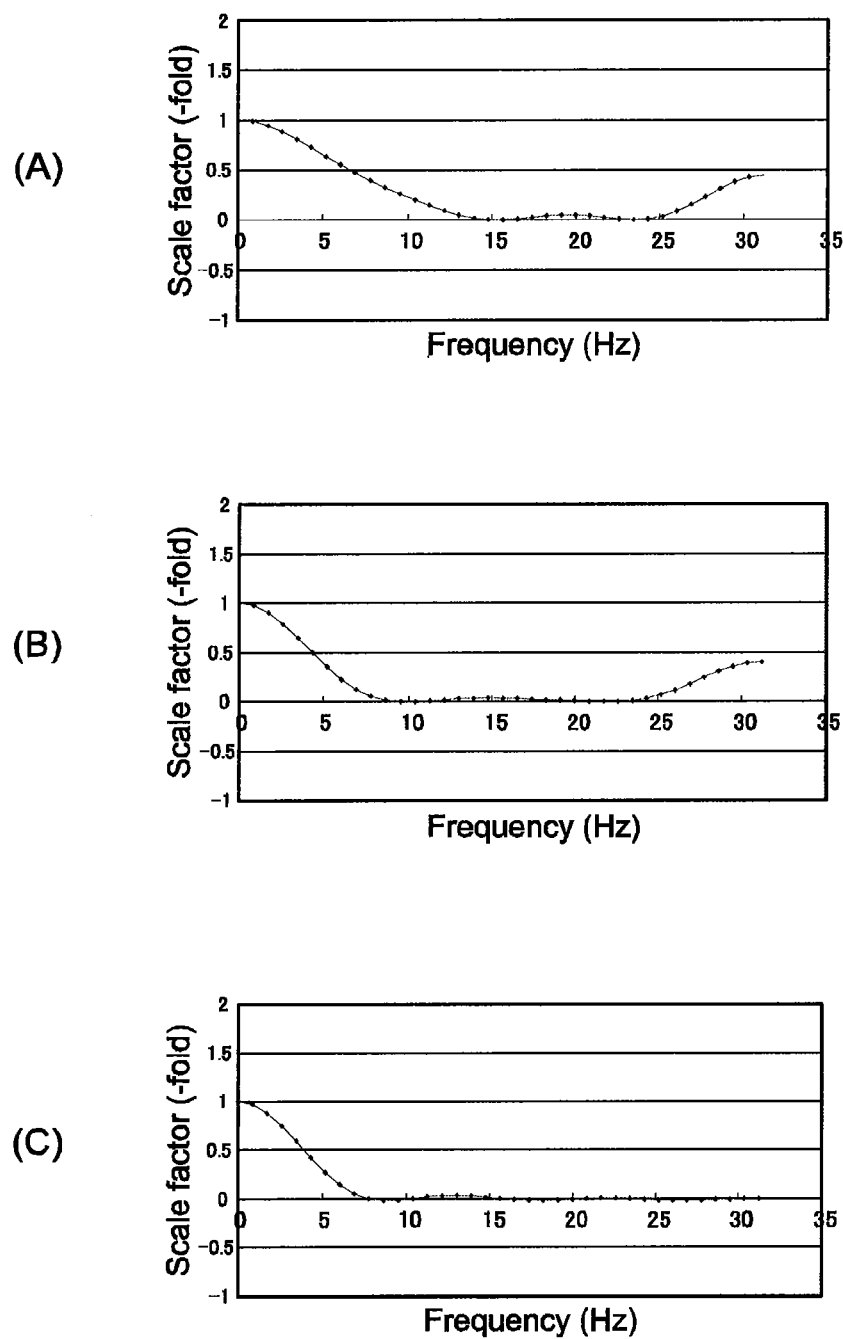
FIG. 24 Graphs showing different frequency characteristics of scale factors.

FIGS. 24A to 24C are graphs showing different frequency characteristics of scale factors. In this example, the frequency ranges to be attenuated are different, and a cutoff frequency is set near 1 Hz in all the graphs shown in FIGS. 24A to 24C.

In FIG. 24A, a scale factor of a frequency component of 15 to 25 Hz is set substantially to 0. In a filter of FIG. 24B, also a scale factor for a frequency component of 15 Hz or less is set substantially to 0, and the filter can thus be considered as a filter stronger than that of FIG. 24A. In a filter of FIG. 24C, also a scale factor of a frequency component of 25 Hz or more is set substantially to 0, and the filter can thus be considered as a filter stronger than that of FIG. 24B.

Information on frequency characteristics (control pattern) of the plurality of scale factors with respect to the same frequency only needs to be stored in the memory 26 or the like in advance. By an adaptive switch by the user, the control section of the MPU 19 controls the scale factor of the filter by the frequency characteristics selected in accordance with the switch. In this case, mainly the MPU 19 functions as a switch means.

The frequency characteristics of scale factors are not limited to those shown in FIGS. 24A to 24C and can be changed as appropriate.

The user only needs to switch the control patterns using a mechanical switch or the like provided to the input apparatus 1 or the control apparatus 40. Alternatively, the input apparatus 1 or the control apparatus 40 may store software for GUIs for the switch, and the user may switch the control patterns using a GUI.

Figure 25:
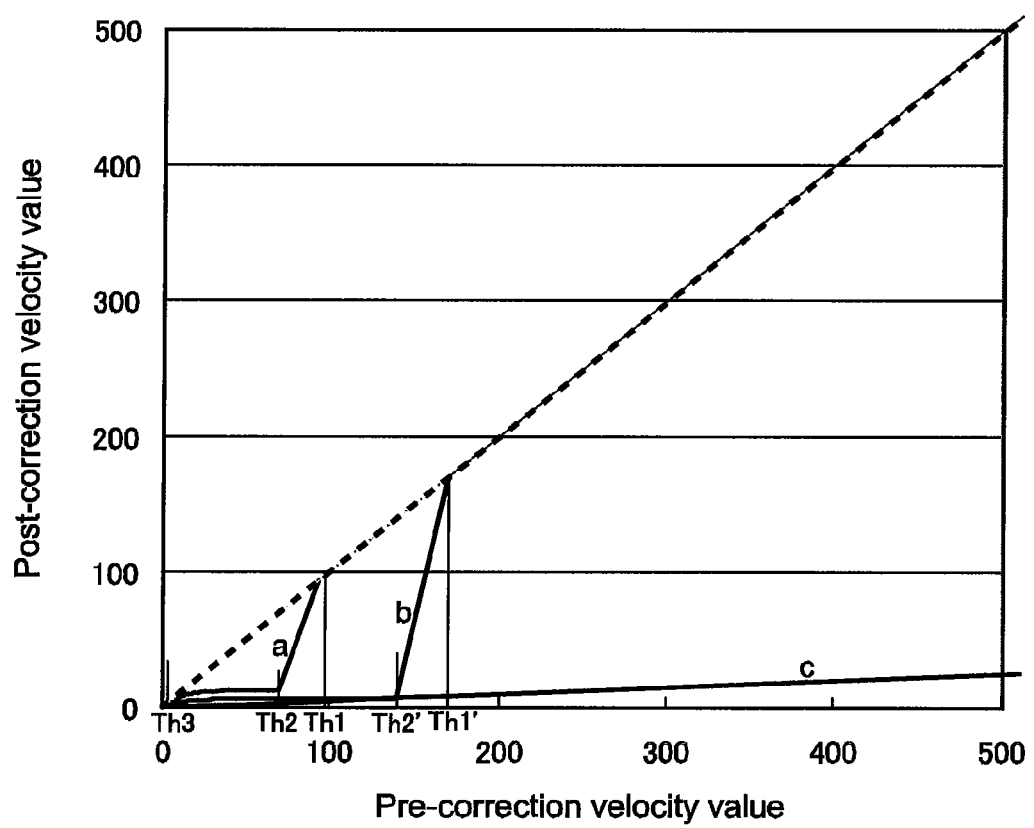
FIG. 25 A graph showing a velocity profile as filter characteristics according to still another embodiment.

FIG. 25 is a graph showing a velocity profile as filter characteristics according to still another embodiment.

Because individual differences in hand movement velocities are large, the inventors of the present invention have determined a velocity range to be a target for the shake correction by obtaining a distribution of magnitudes of shake velocities through a user test at the time the filter was designed. The graph of FIG. 25 shows a result thereof. The magnitude of the shake velocity was set as a maximum vibration velocity, for example.

In this example, three types of velocity profiles are shown.

A velocity profile a is a profile for users within $2\sigma$, in which the velocity range to be the target for the shake correction is narrow.

A velocity profile b is a profile for users within $4\sigma$, in which the velocity range to be the target for the shake correction is wide.

A velocity profile c is a profile that has a constant scale factor regardless of the pre-correction velocity value.

It should be noted that similar to the velocity profile shown in FIG. 11, Th1 (Th1'), Th2 (Th2'), and Th3 are set for the velocity profiles a and b in this example. However, the velocity profiles a and b shown in FIG. 25 may be set to the velocity profiles shown in FIG. 11, 13, or 15, or other velocity profiles.

A velocity profile having a scale factor additionally lower than that of the velocity profile c shown in FIG. 25, that is, a velocity profile asymptotic to the X axis may also be set.

Information on the plurality of velocity profiles a to c (control patterns) is stored in advance in the memory 26 or the like for the same frequency, and Th1, Th2, Th1', Th2', and the like are stored in the memory 26 or the like for each of the control patterns. By the user adaptively switching the velocity profiles a to c, the control section of the MPU 19 controls the scale factor of the filter by the velocity profile selected in accordance with the switch. In this case, mainly the MPU 19 functions as the switch means.

The user only needs to switch the velocity profiles a to c using a mechanical switch or the like provided to the input apparatus 1 or the control apparatus 40. Alternatively, the input apparatus 1 or the control apparatus 40 may store software for GUIs for the switch, and the user may switch the velocity profiles a to c using a GUI.

Next, the velocity profile c of FIG. 25 will be described.

The velocity profile c is a velocity profile with which the phase delay is intensified since the scale factor is low and constant, but is a velocity profile suitable for the user to input letters and pictures, for example. In other words, the velocity profile c is a velocity profile for a manual input mode. With the velocity profiles a and b in which the scale factors are variable, that is, velocity profiles with variable phase delays, some users may find it difficult to input pictures and letters.

Figures 26, 27:
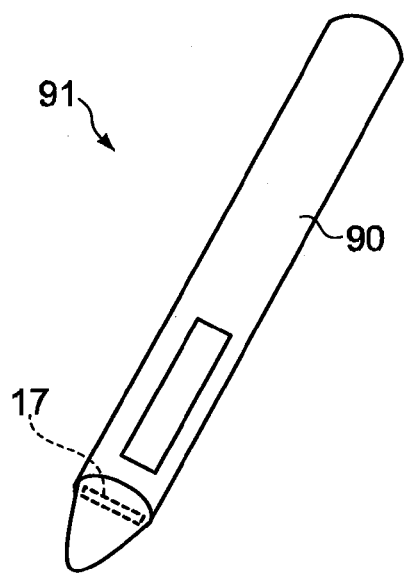
FIG. 26 A diagram showing a pen-type input apparatus suitable for inputting letters and the like as another embodiment of the input apparatus.
FIG. 27 Diagrams showing examples where Japanese characters input to a computer using generally-used letter input software are displayed on the screen.

FIG. 26 is a diagram showing a pen-type input apparatus suitable for the letter input and the like, as another embodiment of the input apparatus 1. The sensor unit 17 is provided in the vicinity of a tip end portion of a pen-type input apparatus 91. The sensor unit 17 is the same as that shown in FIG. 8. A shape of the pen-type input apparatus 91 is not limited to this shape and can be changed as appropriate.

When the user uses the pen-type input apparatus 91, the user holds a casing 90, brings the tip end portion thereof into contact with a desk, a floor, a table, a thigh, or the like (or in a non-contact state), and moves the pen-type input apparatus 91 as if inputting letters and pictures. A concept of the pen-type input apparatus 91 is generally close to an input device used for a tablet PC except that the sensor unit 17 for detecting a position is used in the pen-type input apparatus 91 and that the tip end portion of the pen-type input apparatus 91 does not need to be brought into contact with the screen.

FIGS. 27A and 27B are diagrams showing examples where users input to a computer Japanese characters (representing a, e, i, o, u) using generally-used letter input software and the characters are displayed on the screen. FIG. 27A shows a case where the velocity profile c is used, and FIG. 27B shows a case where the filter function is stopped. It can be seen from the figures that by using the velocity profile c, an influence of minute hand movements of the user when inputting characters and the like can be removed.

It should be noted that one or a plurality of velocity profiles having a constant scale factor different from the scale factor of the velocity profile c may be set.

Alternatively, for the same frequency, for example, the velocity profiles described using FIGS. 13A, 13B, and 13C may be stored in the memory in advance so that the user can make a switch. The memory may be included in the input apparatus 1 (or the pen-type input apparatus 91) or included in the control apparatus 40.

Alternatively, the control apparatus 40 may store, in the ROM 37 or other storage devices, a plurality of GUI modes and a plurality of velocity profiles respectively corresponding to the plurality of GUI modes. The MPU 35 of the control apparatus 40 only needs to switch the velocity profile in accordance with the mode of the GUI displayed on the screen out of the plurality of GUI modes.

The plurality of GUI modes are modes different for each application software for a letter input and the like described above, for example. For example, in a case of the application software for a letter input, the scale factor is set relatively low, that is, a relatively-strong filter setting is set. In a case of other application software, the scale factor is set relatively high, that is, a relatively-weak filter setting is set.

Alternatively, a relatively-strong filter (e.g., velocity profile c) may be set in a GUI window as a target for the letter input, and the scale factor may be set variably in accordance with the velocity values (e.g., velocity profile a or b) outside the GUI window.

Alternatively, the plurality of GUI modes are modes different for each size of the icon 4. When the size of the icon 4 is relatively small, the user is required to carry out precise pointing, so a relatively-strong filter setting is set. On the contrary, when the size of the icon is relatively large, precise pointing is not required that much, so a weak filter setting is set.

In the above embodiments, a structure in which the input apparatus 1 includes the acceleration sensor unit 16 and the angular velocity sensor unit 15 has been described. However, the acceleration sensor unit 16 alone may be provided without providing the angular velocity sensor unit 15. In this case, in Steps 103, 203, and 303, the velocity values only need to be calculated by simply integrating the acceleration values detected by the acceleration sensor unit 16.

FIG. 10 has shown the example where the velocity values are calculated in Step 103 and the scale factor of the filter is controlled based on the velocity values ($V_x$, $V_y$). However, the scale factor may be controlled based on the angular velocity values ($\omega_y$, $\omega_y$) obtained in Step 101. In this case, due to the correlation between the velocities and the angular velocities, profiles that are the same as those of FIGS. 11, 13, 15, 16, 25, and the like can be exemplified as angular velocity profiles. The same holds true in the operations of FIGS. 14 and 18.

Alternatively, instead of the velocity and the angular velocity, the scale factor of the filter may be controlled based on the acceleration, acceleration time change rate, angular acceleration, or angular acceleration time change rate.

When the scale factor of the filter is controlled based on the angular velocity value as described above, the angular velocity sensor unit 15 alone may be provided without providing the acceleration sensor unit 16. In this case, based on the angular velocity values detected by the angular velocity sensor unit 15, the control apparatus 40 calculates displacement amounts of the pointer 2 that correspond to the movement of the casing 10 in the yaw and pitch directions. In this case, the displacement amounts of the pointer 2 that correspond to the angular velocity values may be stored in the memory in advance, or the control apparatus 40 may calculate the displacement amounts using an expression for converting preset angular velocity values into displacement amounts.

In the above embodiments, the example where the scale factor is controlled successively by an operation based on the velocity values (or angular velocity values) has been described. However, the scale factor may be controlled stepwise. Stepwise may be two steps or three steps or more. Specifically, in the case of two steps, for example, the scale factor is controlled to be a constant value smaller than 1 when the velocity values (or angular velocity values) become equal to or smaller than the threshold value.

Descriptions have been given on the examples where the velocity profiles shown in FIGS. 11, 13, 14, 15, and 25 are almost linear. However, the velocity profiles may each be a quadratic curve, other curves, or a line constituted of straight lines and curves.

Figure 15:
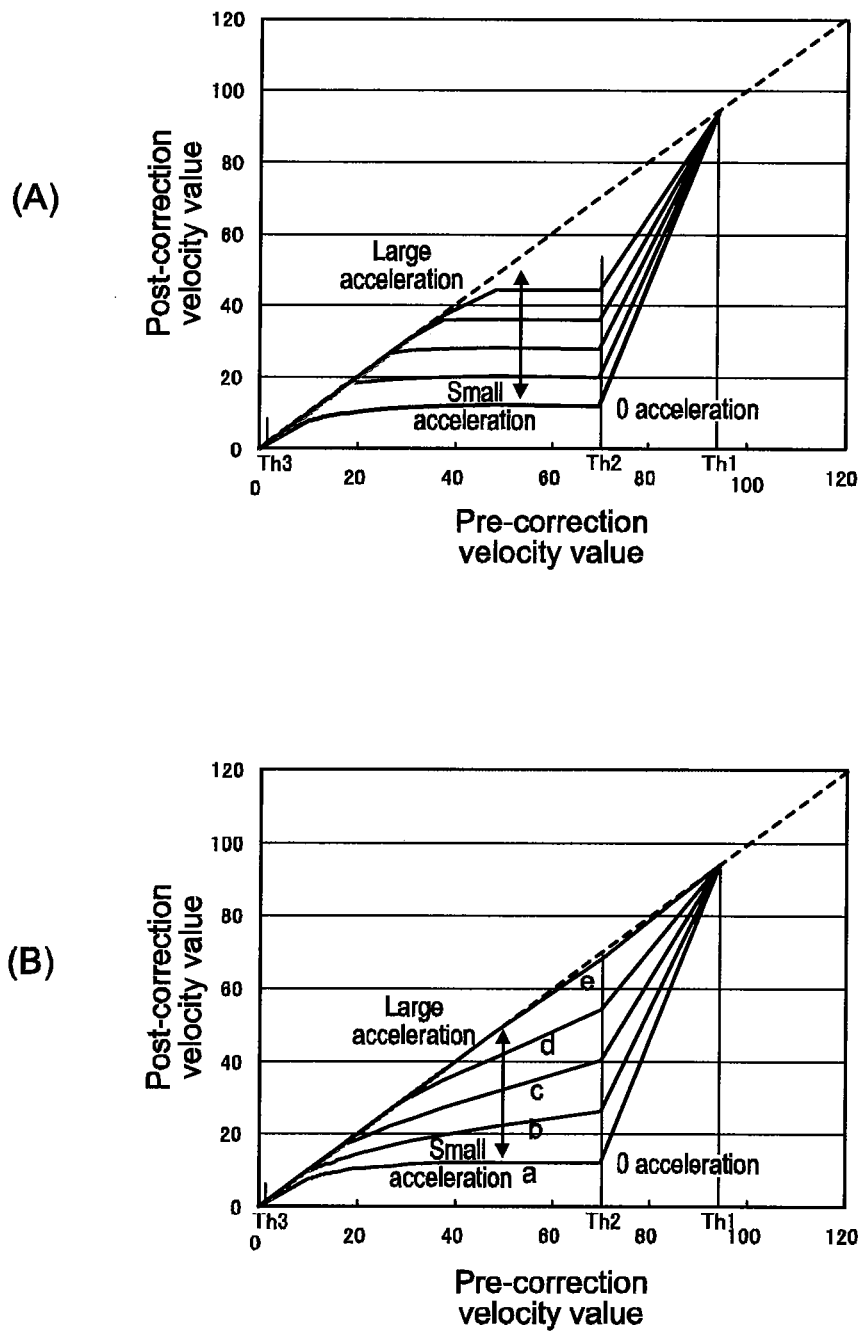
FIG. 15 Graphs showing velocity profiles as characteristics of a filter used in the embodiment shown in FIG. 14.
Figure 16:
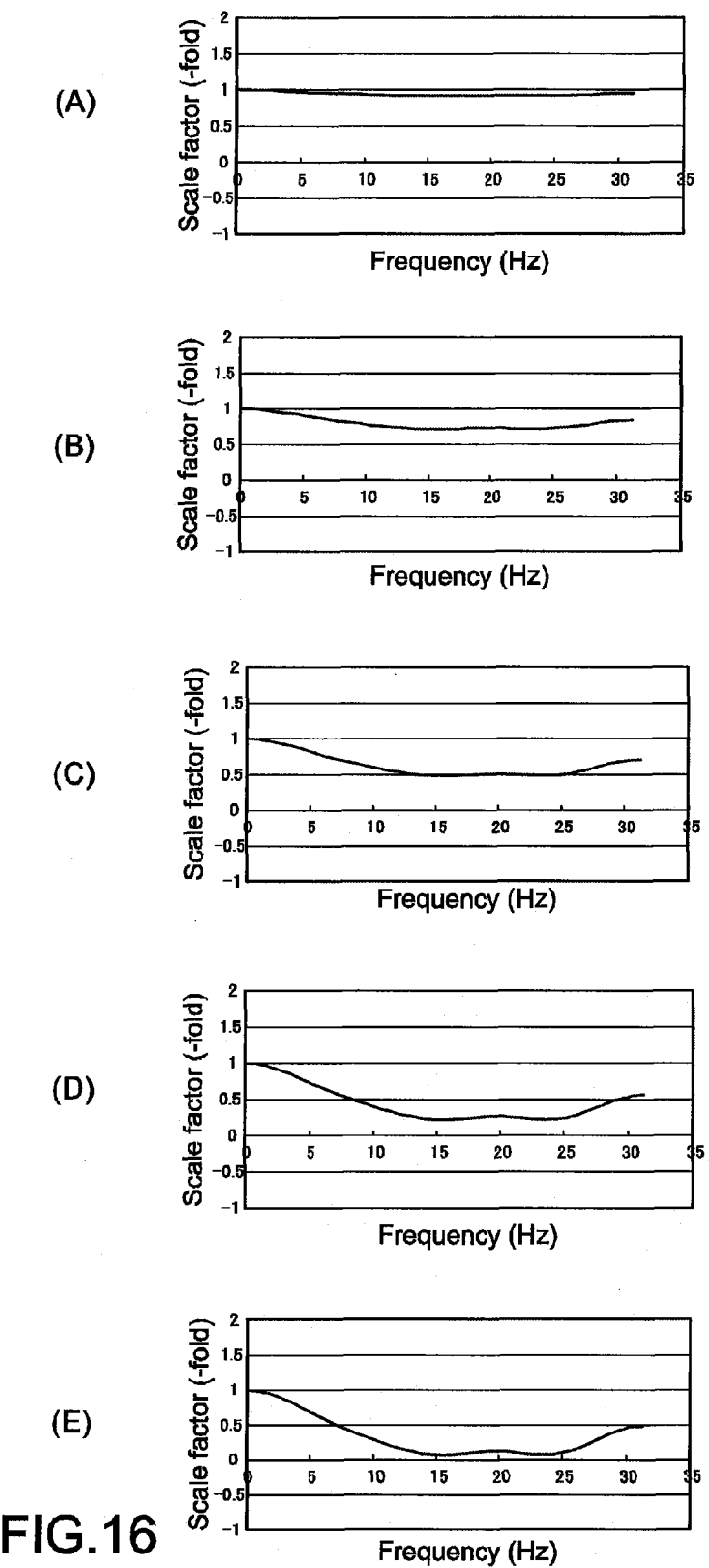
FIG. 16 Graphs showing frequency characteristics of scale factors respectively corresponding to velocity profiles a to e shown in FIG. 15B.

The input apparatus 1 has executed the main portion of the operations in FIGS. 10 and 15 whereas the control apparatus 40 has executed the main portion of the operations in FIG. 23. However, the input apparatus 1 and the control apparatus 40 may execute the operations in an apportioning manner as appropriate.

The embodiments may be applied to, for example, a handheld-type information processing apparatus (handheld apparatus) including a display section. In other words, the handheld apparatus can be considered as an apparatus in which the input apparatus 1 and the control apparatus 40 are integrated. In this case, by the user moving a main body of the handheld apparatus, a pointer displayed on the display section is moved. Examples of the handheld apparatus include a PDA (Personal Digital Assistance), a cellular phone, a portable music player, and a digital camera.

In the above embodiments, the pointer 2 that moves on the screen in accordance with the movement of the input apparatus has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

Instead of the angular velocity sensor unit 15, an angle sensor or an angular acceleration sensor may be used. Examples of the angle sensor include a geomagnetic sensor and an image sensor. When triaxial geomagnetic sensors are used, for example, since change amounts of angle values are detected, angular velocity values can be calculated by differentiating the angle values. The angular acceleration sensor is constituted as a combination of a plurality of acceleration sensors, and angular velocity values can be calculated by integrating angular acceleration values obtained by the angular acceleration sensors.

FIG. 11 has shown the method of calculating the velocity values ($V_x$, $V_y$). However, the present invention is not limited to this method, and the MPU 19 may calculate the velocity values ($V_x$, $V_y$) that correspond to the angular velocity values detected by the angular velocity sensor unit 15. For example, the velocity values corresponding to the angular velocity values are velocity values calculated by a predetermined operation (function of angular velocity values and velocity values) or velocity values read out from the memory using a lookup table. In this case, the acceleration values ($a_x$, $a_y$) detected by the acceleration sensor unit 16 do not need to be used.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An input apparatus for controlling a movement of a pointer on a screen, the input apparatus comprising:
   a casing;
   a movement signal output means for detecting a movement of the casing and outputting a signal corresponding to the movement of the casing;
   an attenuation means for attenuating, by a predetermined scale factor, an output value of a signal of a predetermined frequency range out of an output value output from the movement signal output means; and
   a control means for controlling a velocity of the pointer on the screen that corresponds to the movement of the casing by controlling the predetermined scale factor based on the signal corresponding to the movement of the casing,
   wherein the control means in conjunction with the attenuation means controls the predetermined scale factor by:
   i) selecting a control pattern among a plurality of control patterns based on the output value of the signal of the predetermined frequency range, each control pattern relating predetermined scale factors to frequencies of the output value of the signal within the predetermined frequency range,
   ii) determining a frequency of the output value of the signal of the predetermined frequency range output from the movement signal output means, and
   iii) determining the predetermined scale factor for the selected control pattern based on the determined frequency.

2. The input apparatus according to claim 1, wherein the control means controls the scale factor based on the output value of the signal of the predetermined frequency range out of the signal corresponding to the movement of the casing.

3. The input apparatus according to claim 2, wherein the control means controls the scale factor to decrease as the output value of the signal of the predetermined frequency range increases, and controls the scale factor to increase as the output value of the signal of the predetermined frequency range decreases.

4. The input apparatus according to claim 1, wherein the movement signal output means outputs, as the output value, a velocity value or an angular velocity value corresponding to the movement of the casing, and
   wherein the control means controls the scale factor based on the velocity value or the angular velocity value.

5. The input apparatus according to claim 4, further comprising:
   a storage means for storing the plurality of control patterns of the control means with respect to the scale factor corresponding to the velocity value or the angular velocity value; and
   a switch means for switching the plurality of stored control patterns.

6. The input apparatus according to claim 5, wherein the switch means selectively makes a switch between a first control pattern in which the scale factor is nonconstant and a second control pattern in which the scale factor is constant.

7. The input apparatus according to claim 4,
wherein the movement signal output means additionally outputs an acceleration value corresponding to the movement of the casing, and
wherein the control means controls the scale factor based on the acceleration value and the velocity value or the angular velocity value.

8. The input apparatus according to claim 4, further comprising:
a velocity value storage means capable of storing a predetermined number of a plurality of velocity values that are temporally consecutive; and
a sign judgment means for judging whether signs of the predetermined number of the plurality of stored velocity values are the same,
wherein the control means controls the scale factor so that a function of the attenuation means is stopped or weakened when the signs of the predetermined number of velocity values that have been sampled are the same.

9. The input apparatus according to claim 4, further comprising:
a velocity value storage means capable of storing a predetermined number of a plurality of angular velocity values that are temporally consecutive; and
a sign judgment means for judging whether signs of the predetermined number of the plurality of stored angular velocity values are the same,
wherein the control means controls the scale factor so that a function of the attenuation means is stopped or weakened when the signs of the predetermined number of angular velocity values that have been sampled are the same.

10. The input apparatus according to claim 1,
wherein the predetermined frequency range is a range corresponding to a hand movement of approximately 1 to 20 Hz.

11. A control apparatus for controlling a movement of a pointer on a screen in accordance with input information transmitted from an input apparatus including a casing, a movement signal output means for detecting a movement of the casing and outputting a signal corresponding to the movement of the casing, and a transmission means for transmitting the output signal as the input information, the control apparatus comprising:
a reception means for receiving the input information;
an attenuation means for attenuating, by a predetermined scale factor, an output value of a signal of a predetermined frequency range out of an output value of the signal as the received input information;
a control means for controlling the predetermined scale factor based on the signal corresponding to the movement of the casing; and
a coordinate information generation means for generating coordinate information of the pointer on the screen that corresponds to the movement of the casing under control of the control means,
wherein the control means controls the predetermined scale factor in conjunction with the attenuation means by:
i) selecting a control pattern among a plurality of control patterns based on the output value of the signal of the predetermined frequency range, each control pattern relating predetermined scale factors to frequencies of the output value of the signal within the predetermined frequency range,
ii) determining a frequency of the output value of the signal of the predetermined frequency range output from the movement signal output means, and
iii) determining the predetermined scale factor for the selected control pattern based on the determined frequency.

12. A control system for controlling a movement of a pointer on a screen, the control system comprising:
an input apparatus including
a casing,
a movement signal output means for detecting a movement of the casing and outputting a signal corresponding to the movement of the casing,
an attenuation means for attenuating, by a predetermined scale factor, an output value of a signal of a predetermined frequency range out of an output value output from the movement signal output means,
a control means for generating input information for controlling a velocity of the pointer on the screen that corresponds to the movement of the casing by controlling the predetermined scale factor based on the signal corresponding to the movement of the casing, and
a transmission means for transmitting the generated input information; and
a control apparatus including
a reception means for receiving the transmitted input information, and
a coordinate information generation means for generating coordinate information of the pointer on the screen based on the received input information,
wherein the control means controls the scale factor for the attenuation means based on the output value output from the movement signal output means by:
i) selecting a control pattern among a plurality of control patterns based on the output value of the signal of the predetermined frequency range, each control pattern relating predetermined scale factors to frequencies of the output value of the signal within the predetermined frequency range,
ii) determining a frequency of the output value of the signal of the predetermined frequency range output from the movement signal output means, and
iii) determining the predetermined scale factor for the selected control pattern based on the determined frequency.

13. A control system for controlling a movement of a pointer on a screen, the control system comprising:
an input apparatus including
a casing,
a movement signal output means for detecting a movement of the casing and outputting a signal corresponding to the movement of the casing, and
a transmission means for transmitting the output signal as input information; and
a control apparatus including
a reception means for receiving the input information,
an attenuation means for attenuating, by a predetermined scale factor, an output value of a signal of a predetermined frequency range out of an output value of the signal as the received input information, the attenuation means including a frequency characteristic to attenuate the output value of the signal of the predetermined frequency range using the predetermined scale factor based on a frequency of the output value of the signal of the predetermined frequency range, a control means for controlling the predetermined scale factor for the attenuation means based on the signal corresponding to the movement of the casing by:
  i) selecting a control pattern among a plurality of control patterns based on the output value of the signal of the predetermined frequency range, each control pattern relating predetermined scale factors to frequencies of the output value of the signal within the predetermined frequency range,
  ii) determining a frequency of the output value of the signal of the predetermined frequency range output from the movement signal output means, and
  iii) determining the predetermined scale factor for the selected control pattern based on the determined frequency, and a coordinate information generation means for generating coordinate information of the pointer on the screen that corresponds to the movement of the casing under control of the control means.

14. A control method comprising:

detecting a movement of a casing of an input apparatus;

outputting a signal corresponding to the movement of the casing obtained by the detection;

attenuating, by a predetermined scale factor, an output value of a signal of a predetermined frequency range out of an output value that has been output using a frequency characteristic to attenuate the output value of the signal of the predetermined frequency range using the predetermined scale factor based on a frequency of the output value of the signal of the predetermined frequency range;

controlling the predetermined scale factor for the attenuation means based on the signal corresponding to the movement of the casing by:
  i) selecting a control pattern among a plurality of control patterns based on the output value of the signal of the predetermined frequency range, each control pattern relating predetermined scale factors to frequencies of the output value of the signal within the predetermined frequency range,
  ii) determining a frequency of the output value of the signal of the predetermined frequency range output from the movement signal output means, and
  iii) determining the predetermined scale factor for the selected control pattern based on the determined frequency; and generating coordinate information of a pointer on a screen that corresponds to the movement of the casing based on the control of the predetermined scale factor.

15. A handheld apparatus comprising:

a casing;

a display section;

a movement signal output means for detecting a movement of the casing and outputting a signal corresponding to the movement of the casing;

an attenuation means for attenuating, by a predetermined scale factor, an output value of a signal of a predetermined frequency range out of an output value output from the movement signal output means, the attenuation means including a frequency characteristic to attenuate the output value of the signal of the predetermined frequency range using the predetermined scale factor based on a frequency of the output value of the signal of the predetermined frequency range; and a control means for generating input information for controlling a velocity of a pointer on a screen of the display section that corresponds to the movement of the casing by controlling the predetermined scale factor for the attenuation means based on the signal corresponding to the movement of the casing by:
  i) selecting a control pattern among a plurality of control patterns based on the output value of the signal of the predetermined frequency range, each control pattern relating predetermined scale factors to frequencies of the output value of the signal within the predetermined frequency range,
  ii) determining a frequency of the output value of the signal of the predetermined frequency range output from the movement signal output means, and
  iii) determining the predetermined scale factor for the selected control pattern based on the determined frequency.

16. An input apparatus for controlling a movement of a pointer on a screen, the input apparatus comprising:

a casing;

a movement signal output means for detecting a movement of the casing and outputting a signal corresponding to the movement of the casing for moving the pointer on the screen;

an attenuation means for attenuating, by a predetermined scale factor, an output value of a signal of a predetermined frequency range out of an output value output from the movement signal output means;

a storage means for storing a plurality of control patterns for controlling the scale factor for the attenuation means, each of the control patterns having a frequency characteristic to enable the attenuation means to attenuate the output value of the signal of the predetermined frequency range using the predetermined scale factor based on a frequency of the output value of the signal of the predetermined frequency range by:
  i) selecting a control pattern among the plurality of control patterns based on the output value of the signal of the predetermined frequency range, each control pattern relating predetermined scale factors to frequencies of the output value of the signal within the predetermined frequency range,
  ii) determining a frequency of the output value of the signal of the predetermined frequency range output from the movement signal output means, and
  iii) determining the predetermined scale factor for the selected control pattern based on the determined frequency; and a switch means for switching the plurality of control patterns.

17. A handheld apparatus comprising:

a casing;

a display section;

a movement signal output means for detecting a movement of the casing and outputting a signal corresponding to the movement of the casing for moving a pointer on a screen of the display section;

an attenuation means for attenuating, by a scale factor, an output value of a signal of a predetermined frequency range out of an output value output from the movement signal output means;

a storage means for storing a plurality of control patterns for controlling the scale factor of the attenuation means based on the signal corresponding to the movement of the casing by the attenuation means:
  i) selecting a control pattern among the plurality of control patterns based on the output value of the signal of the predetermined frequency range, each control pattern relating scale factors to frequencies of the output value of the signal within the predetermined frequency range, ii) determining a frequency of the output value of the signal of the predetermined frequency range output from the movement signal output means, and iii) determining the scale factor for the selected control pattern based on the determined frequency; and a switch means for switching the plurality of control patterns.

* * * * *